(12) United States Patent
Sonntag et al.

(10) Patent No.: US 7,424,380 B2
(45) Date of Patent: Sep. 9, 2008

(54) METHOD AND APPARATUS FOR INTEGRATED DISTRIBUTION FUNCTION CAPTURE

(75) Inventors: Jeffrey Lee Sonntag, Portland, OR (US); John Theodore Stonick, Portland, OR (US); Daniel Keith Weinlader, Allentown, PA (US)

(73) Assignee: Synopsys, Inc., Mountain View, CA (US)

( * ) Notice: Subject to any disclaimer, the term of this patent is extended or adjusted under 35 U.S.C. 154(b) by 41 days.

(21) Appl. No.: 11/291,760

(22) Filed: Nov. 30, 2005

(65) Prior Publication Data

US 2007/0121759 A1     May 31, 2007

(51) Int. Cl.
*H04L 27/00* (2006.01)
(52) U.S. Cl. ........................................ 702/66
(58) Field of Classification Search ............... 702/66; 375/227

See application file for complete search history.

(56) References Cited

U.S. PATENT DOCUMENTS

2002/0196510 A1*   12/2002   Hietala et al. ............... 359/189

2006/0018374 A1*   1/2006   Nelson et al. ............... 375/227

OTHER PUBLICATIONS http://mw1.merriam-webster.com/dictionary/record, p. 1.*
http://www.merriam-webster.com/dictionary/phase, p. 1.*

* cited by examiner

*Primary Examiner*—Tung S Lau
(74) *Attorney, Agent, or Firm*—Park, Vaughan & Fleming LLP

(57) ABSTRACT

Probability distribution functions (PDFs), of a periodic input data signal, can be used to provide eye-diagram information. An advantage of PDFs, over conventional approaches to eye-diagram collection, is that analog-to-digital conversion can be accomplished by the slicer of a receiver, provided the slicer can programmably change its threshold. A cumulative distribution function (CDF), at a particular phase of a desired eye-diagram, can be collected by having a receiver's slicer scan its threshold level. For each threshold level, a fixed number of symbols can be analyzed as follows to produce a CDF value: count the number of times a particular symbol value occurs. The derivative of a CDF can produce its PDF, where each PDF can represent a "slice" of a desired eye-diagram. For a non-periodic input signal, an eye diagram can still be formed so long as the percentage occurrence, of each symbol value, remains at least approximately the same.

23 Claims, 21 Drawing Sheets

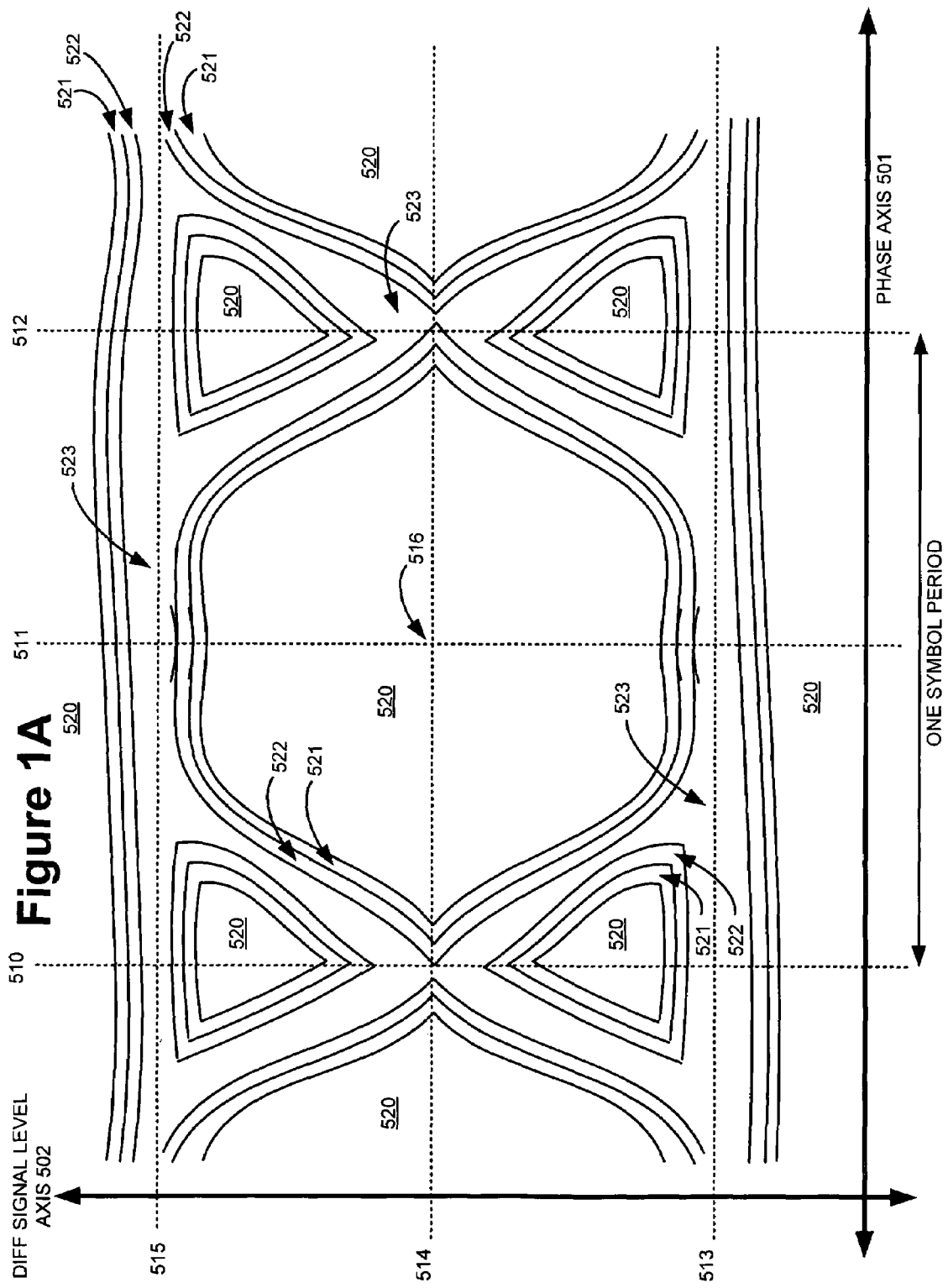

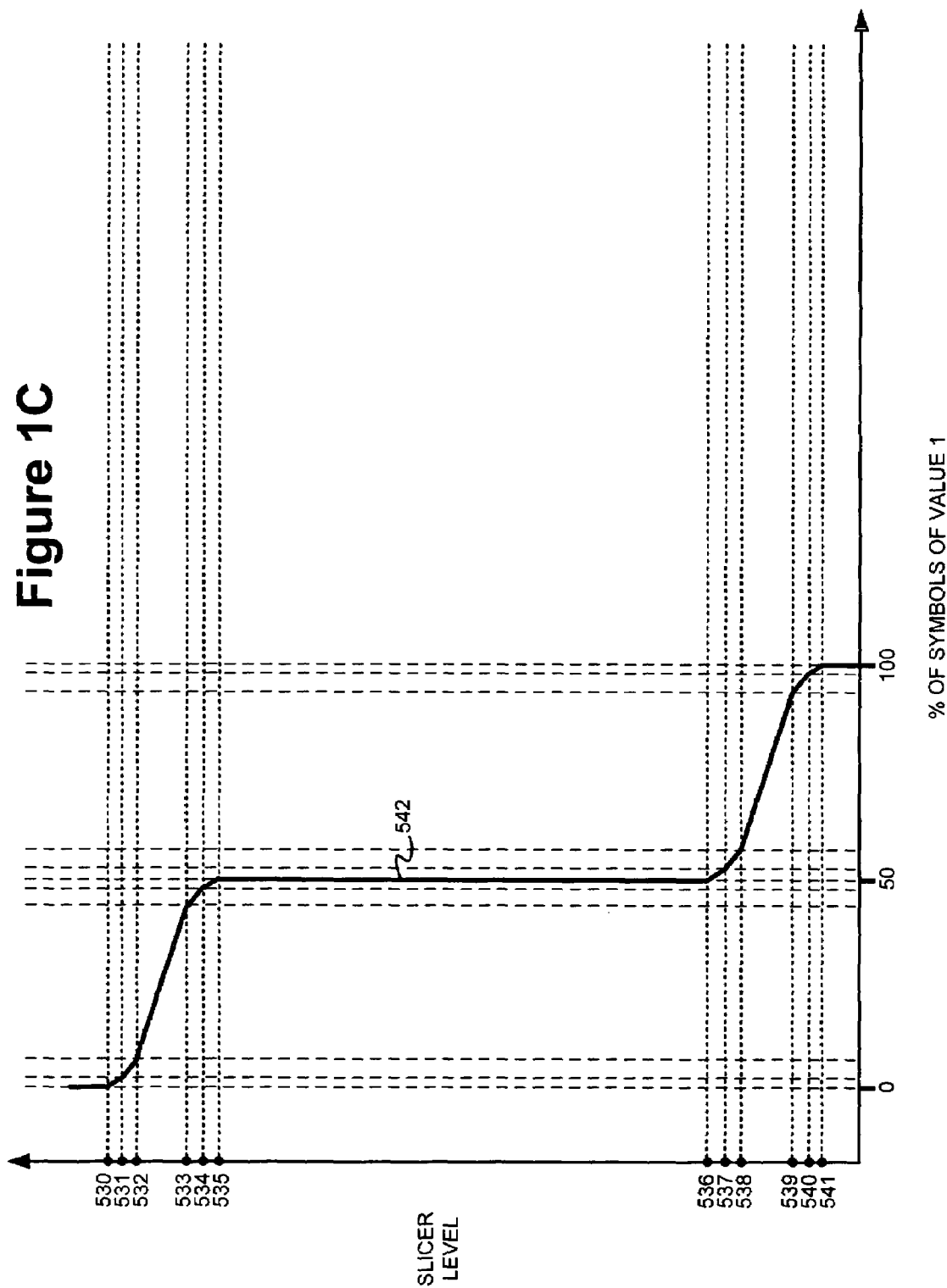

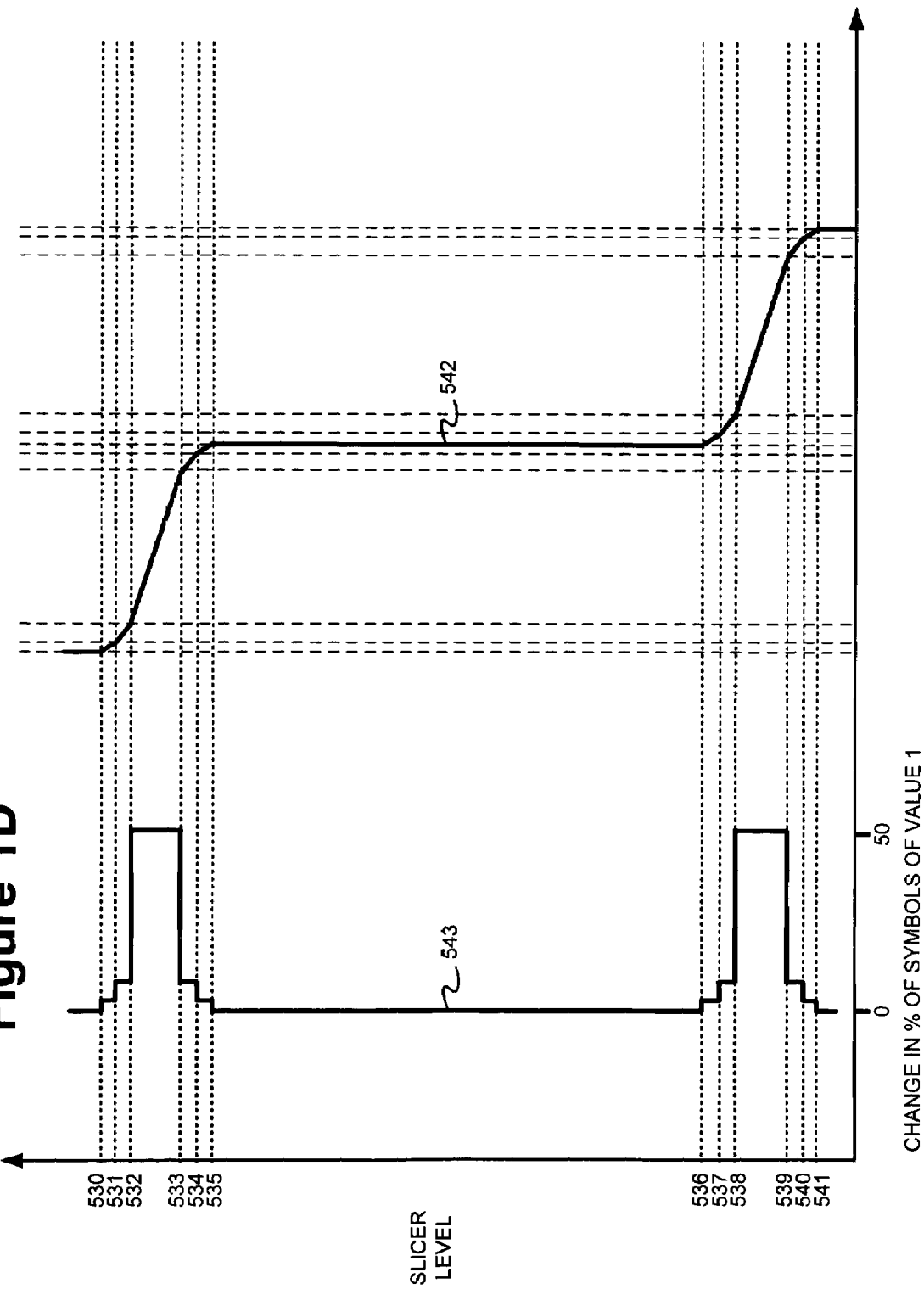

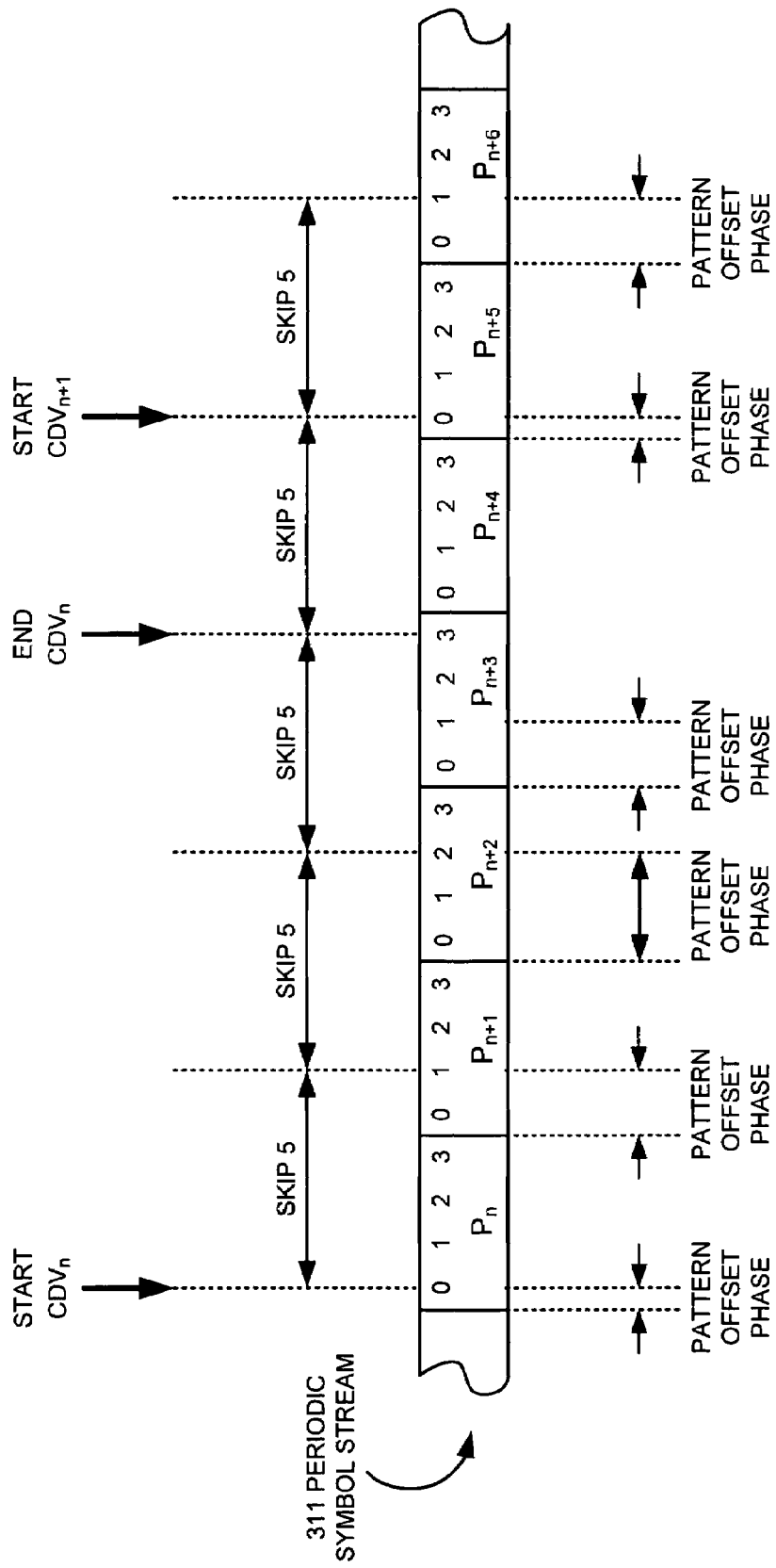

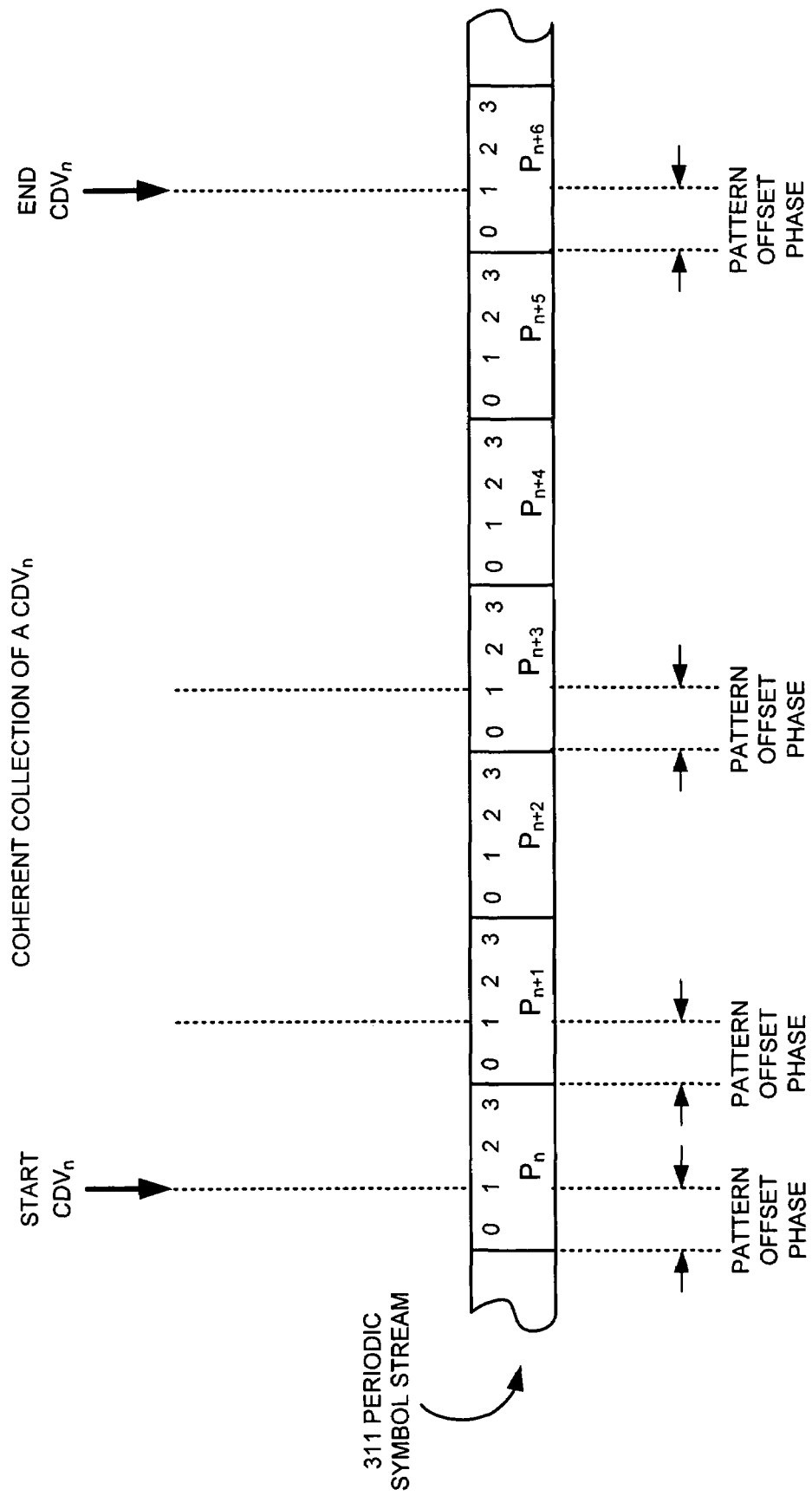

EXAMPLE DESERIALIZER FOR PERIOD 5 SYMBOL
TESTING FROM 10 SYMBOL PIPE

SCANNING EACH PHASE OF AN EYE DIAGRAM

SCANNING EACH SLICER LEVEL OF AN EYE DIAGRAM PHASE

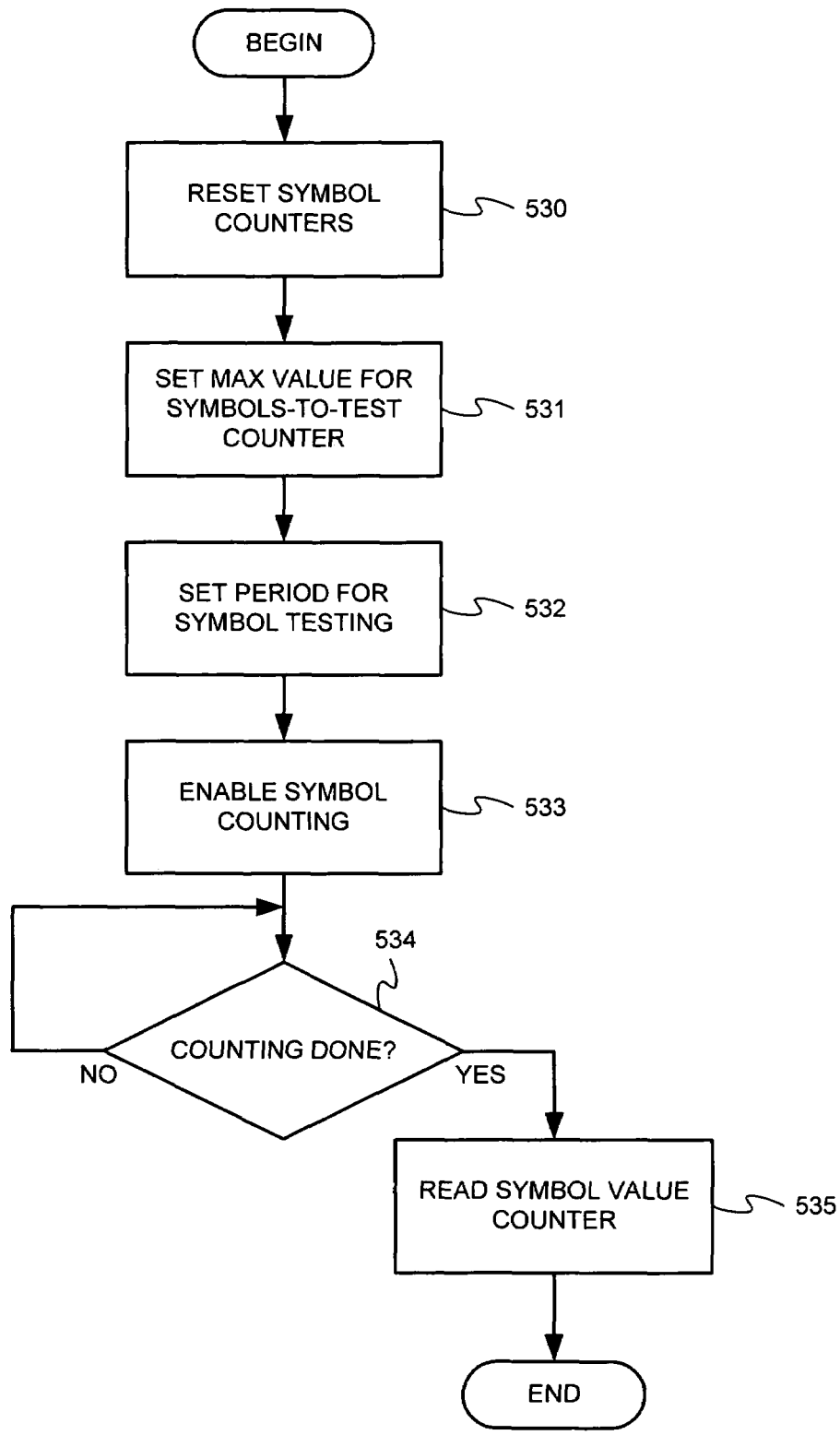

EXAMPLE DIFFERENTIAL DATA TRANSMISSION
WHERE BOTH INPUTS HAVE SAME OFFSET

RESULTING DIFFERENTIAL SIGNAL HAS OFFSET
OF ZERO

EXAMPLE DIFFERENTIAL DATA TRANSMISSION
WHERE INPUTS HAVE DIFFERENT OFFSETS

RESULTING DIFFERENTIAL SIGNAL HAS
NONZERO OFFSET

METHOD AND APPARATUS FOR INTEGRATED DISTRIBUTION FUNCTION CAPTURE

FIELD OF THE INVENTION

The present invention relates to the capture of distribution functions for purposes of electrical signal analysis.

BACKGROUND OF THE INVENTION

1. Signal Analysis Tools

Visibility of an analog signal, at the input to a high-speed receiver, is useful for link characterization and debugging. One of the most common and interesting visualizations of a high-speed receiver's signal is commonly known as an "eye-diagram." An eye-diagram can be constructed as a composite plot by: sampling a received signal, "slicing" the received signal into segments of duration equal to a single symbol-time of the signal and visually overlaying the segments. Typically, eye-diagrams are produced with a stand-alone digital sampling oscilloscope (DSO). The DSO can couple to a receiver at its printed circuit board (PCB) traces, with the traces selected to be as close as possible to the integrated circuits (ICs) of the receiver that directly handle the high-speed input signal.

Disadvantages to using a stand-alone DSO include the following:

1. Connecting an external DSO to the signal line, by which a receiver IC receives its input, is not always practical. For example, in a production system, with a densely packed chassis, the relevant high speed PCB traces may not be available for external access. An approach to this problem is to "swap-out" boards, of the system under test, for special test boards that do provide the necessary access. However, the special test boards can significantly change the characteristics of the channel the DSO is measuring.
2. Even if the relevant PCB traces are accessible, the DSO cannot precisely match the termination impedance of the receiver. Thus, the signal representation shown on the DSO is not the exact signal at the receiver, but the signal as modified by the presence of the DSO connection.
3. Finally, because an external DSO is outside the chip package, signal characteristics due to the chip package will not be visible.

The aforementioned disadvantages make it desirable to integrate sampling, of the received signal, onto the same physically contiguous IC on which a receiver's comparators are located.

One such approach, is described in the following U.S. Patent Application (the 0601 Application):

Title: Method and Apparatus For Integrated Undersampling
Inventor: Jeffrey Lee Sonntag
Filed: Aug. 31, 2004
application Ser. No. 10/930,292

In the 0601 Application, an analog sample-and-hold circuit is added to the receiver's IC. The sample-and-hold is connected in parallel to the receiver's comparators. The analog output of the sample-and-hold circuit is converted to a digital value using an analog-to-digital converter. The analog-to-digital converter can be located on the same IC as the receiver and sample-and-hold circuit. Because real-time capture of a signal is not required for production of an eye-diagram, the sample-and-hold circuit can undersample the input signal and thus operate at a lower-frequency that is largely independent of the input signal's bandwidth. Thus, while the sampling aperture of the sample-and-hold must be fast, the collection of successive samples can be accomplished at a rate that is slow compared to the data rate.

A drawback of the sample-and-hold approach is that the sample-and-hold circuit's bandwidth (sampling aperture) must be matched to that of the receiver's input comparators. Such matching is needed to ensure the sample-and-hold circuit captures are an accurate measure of what the receiver measures. Such matching can never be exact due to process variations that occur, which include variations within the same IC.

Additionally, the sample-and-hold approach requires significant silicon area due to the area-expensive analog-to-digital converter required for measuring the sampled value. Finally, when the sample-and-hold approach is to be included as a feature of "silicon IP" (i.e., is included in a design intended for use in multiple, independent, IC design projects), portability of this approach is difficult and can require significant analog design effort.

2. An Overview of Known ASIC Design Flow

Before providing a detailed description of the invention, it can be helpful to place "silicon IP" circuits in context. FIG. 11 shows a simplified representation of an exemplary digital ASIC design flow. At a high level, the process starts with the product idea (step 2100) and is realized in an EDA software design process (step 2110). When the design is finalized, it can be taped-out (event 2140). After tape out, the fabrication process (step 2150) and packaging and assembly processes (step 2160) occur resulting, ultimately, in finished chips (result 2170).

The EDA software design process (step 2110) is actually composed of a number of steps 2112-2130, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 2110) will now be provided. Silicon IP circuits can be included in step "a":

a) System design (step 2112): The designers describe the functionality that they want to implement; they can perform what-if planning to refine functionality, check costs, etc. Hardware-software architecture partitioning can occur at this stage. Exemplary EDA software products from Synopsys, Inc. that can be used at this step include MODEL ARCHITECT, SABER, SYSTEM STUDIO, and DESIGNWARE products.

b) Logic design and functional verification (step 2114): At this stage, the VHDL or Verilog code for modules in the system is written and the design is checked for functional accuracy. More specifically, the design is checked to ensure production of functionally correct outputs. Exemplary EDA software products from Synopsys, Inc. that can be used at this step include VCS, VERA, DESIGNWARE, MAGELLAN, FORMALITY, ESP and LEDA products.

c) Synthesis and design for test (step 2116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include DESIGN COMPILER, PHYSICAL COMPILER, TEST COMPILER, POWER COMPILER, FPGA COMPILER, TETRAMAX, and DESIGNWARE products.

d) Netlist verification (step 2118): At this step, the netlist is checked for compliance with timing constraints and for correspondence with the VHDL/Verilog source code. Exemplary EDA software products from Synopsys, Inc. that can be used at this step include FORMALITY, PRIMETIME, and VCS products.

e) Design planning (step 2120): Here, an overall floorplan for the chip is constructed and analyzed for timing and top-level routing. Exemplary EDA software products from Synopsys, Inc. that can be used at this step include ASTRO and IC COMPILER products.

f) Physical implementation (step 2122): The placement (positioning of circuit elements) and routing (connection of the same) occurs at this step. Exemplary EDA software products from Synopsys, Inc. that can be used at this step include the ASTRO and IC COMPILER products.

g) Analysis and extraction (step 2124): At this step, the circuit function is verified at a transistor level, this in turn permits what-if refinement. Exemplary EDA software products from Synopsys, Inc. that can be used at this step include ASTRORAIL, PRIMERAIL, PRIMETIME, and STAR RC/XT products.

h) Physical verification (step 2126): At this step various checking functions are performed to ensure correctness for: manufacturing, electrical issues, lithographic issues, and circuitry. Exemplary EDA software products from Synopsys, Inc. that can be used at this step include the HERCULES product.

i) Resolution enhancement (step 2128): This step involves geometric manipulations of the layout to improve manufacturability of the design. Exemplary EDA software products from Synopsys, Inc. that can be used at this step include PROTEUS, PROTEUSAF and PSMGEN products.

j) Mask data preparation (step 2130): This step provides the "tape-out" data for production of masks for lithographic use to produce finished chips. Exemplary EDA software products from Synopsys, Inc. that can be used at this step include the CATS(R) family of products.

SUMMARY OF THE INVENTION

Please refer to the Glossary of Selected Terms, included at the end of the Detailed Description, for the definition of selected terms used in the below Summary. Section numbers in the below Summary correspond to section numbers in the Detailed Description.

1. Summary of Overview

The present invention relates to the collection of distribution functions, of a data signal, and to using such distribution functions to provide waveform information similar to that provided by a DSO (e.g., an "eye-diagram"). An advantage of distribution functions, over conventional approaches to waveform collection, is simplified analog-to-digital conversion. Where the objective is to collect waveform information on a data transceiver, such analog-to-digital conversion can be accomplished by the receiving slicer of such transceiver. To accomplish such analog-to-digital conversion, a slicer need only have the capability for programmably changing its threshold.

An overview of the present invention is presented by way of an example. The example begins with a simplified standard eye-diagram that is to be an end result of an application of principles of the present invention. The example eye-diagram presented is for a binary signal. It is assumed the data transmitted by the binary signal is periodic. The number of symbols, comprising one repetition of the data, is referred to as the "$data_{13}$ period." A third dimension of an eye-diagram, which can be represented by intensity or color, can be used to depict the relative frequency with which traces occur at particular signal levels and phases.

Collection of a cumulative distribution function (CDF), at a particular phase of the desired example eye-diagram, is presented. The particular example phase is referred to as phase 511.

Rather than having a receiver's slicer threshold at a fixed differential signal level, a "scan" of the differential signal level axis, can be performed.

For each slicer threshold level of the scan, a fixed number of symbols (referred to herein as "CDV_sample_size") can be analyzed in order to produce a value (referred to as a "CDV") for the CDF. For purposes of the overview, it is assumed CDV_sample_size is an integer multiple of data_period.

The analysis of CDV_sample_size symbols can be accomplished as follows: count the number of times a particular symbol value occurs. Where the input signal is binary, the analysis is counting either the number of "one" symbols or the number of "zero" symbols. Each count of symbols of a particular value, over a total of CDV_sample_size symbols, is referred to herein as a "CDF value" (or "CDV") because it can add another value to a CDF.

A relationship between slicer level, and the number of symbols counted as one, for a phase 511 of an eye-diagram, is presented as a plot 542. Plot 542 can also be referred to as a CDF. If the number of integer multiples of data_period represented by CDV_sample_size is "data_period_multiple," the CDV_sample_size symbols, sampled for the determination of each CDV, represent data_period_multiple repetitions of the input signal's pattern.

Conversion of a CDF into a probability distribution function (PDF), and illustration of how such PDF can represent a "slice" of the desired eye-diagram at a particular phase, is presented.

The relationship between slicer level, and the change in the number of symbols counted as one, for a phase 511 of an eye-diagram, is depicted as a plot 543. Plot 543 can also be referred to as a PDF. The PDF can be found by determining the difference between successive points of the CDF. Alternatively, the PDF is the derivative of the CDF.

A PDF plot 543 can be placed, at phase 511, in an eye-diagram to be produced. The PDF introduces a third dimension to such eye-diagram, at phase 511, that can be represented by, for example, intensity or color mapping.

The above-described example presents a procedure for finding a PDF at a single phase (e.g., phase 511), in order to represent a single vertical slice through an eye diagram. By moving the phase to other positions along the eye period, and applying the above procedure at each new phase location in the same manner as discussed above for phase 511, an eye diagram can be produced in its entirety.

The overview example presents a procedure that can be used whenever the data of the input signal is periodic.

2. Summary of Modes of Operation

To more fully describe modes of operation of the invention, additional timing information is presented.

To reliably sample an input signal at a particular phase, to detect the occurrence of CDV_sample_size symbols for collection of a CDV, the input signal and sample clock can be made synchronous to a reference clock. Given a synchronous relationship, a sample clock edge (or SCE) has a certain offset phase, referred to herein as a "symbol offset phase," with respect to the symbol of the input signal it samples.

A symbol stream can either be periodic or non-periodic, and it will still have a certain symbol offset phase with respect to its SCEs. For the SCEs to have a pattern offset phase, however, in addition to having a symbol offset phase, a symbol stream needs to be periodic.

Sampling of a periodic input signal can be accomplished in at least the following ways.

Incoherent sampling can be characterized by its ability to capture an eye-diagram (in which the various types of transitions that occur, over a symbol interval, are overlaid).

For the present invention, incoherent sampling, of a periodic input signal, can be accomplished as follows. Within each group of CDV_sampling_edges, there is a group of SCEs (referred to herein as "data_period_edges") for each repetition of the periodic data. Thus, there are data_period_multiple groups of data_period_edges in each group of CDV_sampling_edges. Each group of data_period_edges can sample as follows: each of its SCEs has a unique corresponding symbol, of a repetition of the input pattern, that it samples. Such sampling can be achieved by any appropriate method.

Coherent sampling can be characterized by its ability to reconstruct a pattern, or a portion of a pattern, as a signal. For the present invention, coherent sampling, of a periodic input signal, can be accomplished as follows. For each group of CDV_sample_edges, each of its member SCEs has the same pattern offset phase (as well as the same symbol offset phase).

Such fixed pattern offset phase can be achieved if the period, for sampling symbols for tabulation in a CDV, is the same as (or is an integer multiple of) the length of an input data pattern.

Even if the data of the input signal is non-periodic, the present invention can still be used, provided certain other limitations are met. In general, an eye diagram can be formed so long as the following condition is satisfied by the input data: over each occurrence of CDV_sample_size symbols, the percentage occurrence, of each symbol value, remains the same (or at least approximately the same).

The percentage occurrence, of each symbol value, remains approximately the same when the input data is any of the following: code space balanced, pseudo-random balanced or random.

To the extent the percentage occurrence of each symbol value varies, over successive CDV determinations, noise is introduced into the resulting eye-diagram. Such noise can be particularly visible in those areas of the eye-diagram where no signal levels actually occur, such as in the central "eye" of an eye-diagram.

Such noise can be reduced by counting as zero those PDF values below a certain threshold. If the extent of variation, of the percentage occurrence of each symbol value, cannot be bounded, however, then it is not possible to completely eliminate such noise.

If the non-periodic symbol stream is code-space based balanced, and if each successive symbol of the non-periodic symbol stream is sampled, then the extent of variation, of the percentage occurrence of each symbol value, can be bounded. If such CDVs are sufficiently rounded, it can be ensured that CDVs that should be exactly the same are exactly the same. The rounding creates a quantization noise, whose magnitude is inversely proportional to the CDV period (i.e., CDV_sample_size). If CDV_sample_size is large enough, the quantization noise introduced by the rounding can be less than the noise introduced by the color mapping.

3. Summary of Example Hardware

Example hardware, for implementation of the present invention, is presented.

Those aspects of the example hardware, that are general to differential data transmission (DDT), are as follows.

An example system for differential data transmission can transmit data over a pair of conductors (or "a differential pair") 120 and 121. A differential transmitter 113 can transmit data to a receiver 163. The sub-systems of receiver 163 can be integrated on a single, physically contiguous, integrated circuit (IC). Conductors 120 and 121 can couple to IC 163 at points 160 and 161. Differential transmitter 113 can transmit in synchronization with a reference clock 162. Reference clock 162 can also be applied to IC 163.

IC 163 can also have a port (e.g., JTAG port 164) for coupling to a data processing system (DPS) 400 where the distribution functions can be determined. JTAG port 164 can couple to an internal controller 165, located on IC 163. Internal controller 165 can provide a means by which DPS 400 can issue commands, or send data to, sub-systems of IC 163. Also, internal controller 165 can provide a means by which DPS 400 can poll, or receive data from, sub-systems of IC 163.

Data Processing System 400 can be any stored-program computer.

IC 163 can be designed to recover the clock, for sampling of the input data on conductors 120 and 121, from the input data itself. An IC capable of this can include subsystems to perform "clock and data recovery" (CDR). An analog PLL ("APLL"), referred to as APLL 100, can be part of a CDR. APLL 100 can produce a clock 131 that is synchronized to reference clock 162. APLL 100 can also include a phase shift input (e.g., a phase shift input 139) to allow for adjustment of clock 131 relative to the sample clock recovered from the received data. Clock 131 can be used to clock a receiver 114 (where receiver 114 can also be part of IC 163) such that receiver 114 operates synchronously with respect to the differential data received over conductors 120 and 121.

A deserializer 116 can be part of the CDR for IC 163.

Receiver 114 can have a differential pair as input (e.g., input nodes 122 and 123) and can produce appropriate logic levels at its output (e.g., output node 115). Receiver 114 can be a comparator that outputs a signal level corresponding to a logic one if a signal level (e.g., a voltage) at its positive (or "+") input is greater than a signal level at its negative (or "−") input. Conversely, receiver 114 can output a signal level corresponding to a logic zero if a signal level at its negative input is greater than a signal level at its positive input.

Coupling capacitors (e.g., capacitors 110 and 112) can be placed between the transmitter 113 and receiver 114. For example, under the "PCI EXPRESS" standard, coupling capacitors are used.

A DC offset circuit 111 can also be placed between the transmitter 113 and receiver 114. DC offset circuit 111 can be used to shift the differential signal level of the DDT received by receiver 114.

While receiver 114 has been described as a single comparator, it can be readily appreciated that multiple comparators can be appropriate.

Those aspects of an IC 163, that are less generic, are as follows: a programmable slicer level, a non-CDR controlled phase control input and symbol counters.

The receiver input comparator (i.e., its "slicer") can be provided with a programmable threshold for distinguishing between symbols. When the slicer is used for a binary signal (e.g., receiver 114), it can slice at arbitrary voltage levels, rather than just at the middle of the data eye.

The phase control input, of a receiver's CDR unit, can be put under "manual" control such that the phase, for which a CDV is to be collected, can be selected. In the example hardware presented, the CDR includes an APLL 100 that has a phase shift input 139 for selecting the phase of each CDV collected. The data processing system can control the phase shift of APLL 100 by having internal controller 165 specify an appropriate phase shift on input 139.

The following symbol counters and registers can be added to a receiver IC 163. Each symbol of the input stream, whose value is tested, can be counted by a "symbol-to-test counter" (or "STT counter 155"). The maximum count to be reached by STT counter 155 can be loaded into a "maximum for STT counter" register (or "STT max reg" 165). The period, for testing symbols of the input stream, can be determined by the value loaded into a "period-for-symbol-testing" register (or "PFST reg 157"). The number of times a tested symbol resolves to a particular value (e.g., for a binary signal the symbol can be of value "1" or "0") can be counted by a "symbol value counter" (or "SV counter 156"). These counters and registered can be described as constituting, within IC 163, a counter unit 150.

A counter unit 150 can be operated as follows, by DPS 400, to effect collection a CDV. The process assumes the phase has already been set at phase shift input 139 of APLL 100 and the slicer level has already been set.

The process can begin with DPS 400 causing STT counter 155 and SV counter 156 to be reset to zero.

A maximum count value, for STT counter 155, can be programmed.

The period, for testing symbols of the input stream, can be programmed. Setting the period, for testing symbols of the input stream, to longer than the period for successive symbols of the input data, has the following advantage: it allows the counters of counter unit 150 to operate at a lower frequency. Such longer period can be accomplished with deserializer 116.

If the input data is periodic, appropriately setting the period for testing symbols of the input stream allows for the desired mode of signal sampling (e.g., incoherent or coherent) to be selected.

Counting, by STT counter 155 and SV counter 156, can be allowed to begin. STT counter 155 can advance in conjunction with the availability of data from a deserializer. As data becomes available from a deserializer it can also be tested for an appropriate value to advance SV counter 156. When STT counter 155 reaches it maximum permissable count, further counting by STT counter 155 and SV counter 156 can be disabled. The data processing system can read the count on symbol value counter 156.

For a next CDV, the process can be repeated.

4. Summary of Processes

Example processes, for production of distribution functions in accordance with the present invention, are presented.

In terms of the example hardware, the example processes can be executed on a data processing system operating in conjunction with IC 163.

An example process, for producing a PDF for each phase of an eye-diagram, is as follows.

Select an initial current phase (called "cur_phase") at which a PDF is to be collected.

A cumulative distribution function (CDF) for cur_phase is collected (further detail, on an example process for collecting a CDF, is discussed below).

By taking the derivative of the CDF, its PDF can be found.

The PDF can be converted into an appropriate color scale for viewing.

The next phase, for collection of a CDF, can be determined.

If all phases, for production of the desired eye-diagram, have been scanned, then end production of the eye-diagram. Otherwise, loop back to collection of another CDF at cur_phase.

An example process, for producing a CDF for each phase of an eye-diagram, is as follows.

The receiver's slicer level is set to an initial value, where the current slicing level can be represented as "cur_slicer." The initial value for cur_slicer can be either a maximum slicer level or a minimum slicer level.

A CDV can be collected for the current slicer level. A process, for collection of a CDV at preset phase and slicer levels, is discussed above.

The current CDV can be added to the CDF for cur_phase. The CDF, for a current value of cur_phase, can be organized as an array of values. Each index of the array can correspond to a setting of the slicer level.

The receiver's slicer level can be set to a next value for collection of a CDV.

If all slicer levels, for production of a CDF at a particular phase, have been scanned, then end production of the CDF. Otherwise, loop back to collection of another CDV at cur_slicer.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1A depicts a simplified standard example eye-diagram for a binary signal.

FIG. 1C depicts a CDF plot 542.

FIG. 1D depicts a PDF plot 543.

FIG. 3B shows a period, for sampling symbols for tabulation in a CDV, that is prime with respect to the length of an input data pattern.

FIG. 3C shows an example of fixed pattern offset phase to achieve coherent sampling.

FIG. 5C depicts a process to effect collection a CDV.

DETAILED DESCRIPTION OF PREFERRED EMBODIMENTS

Figure 1B:
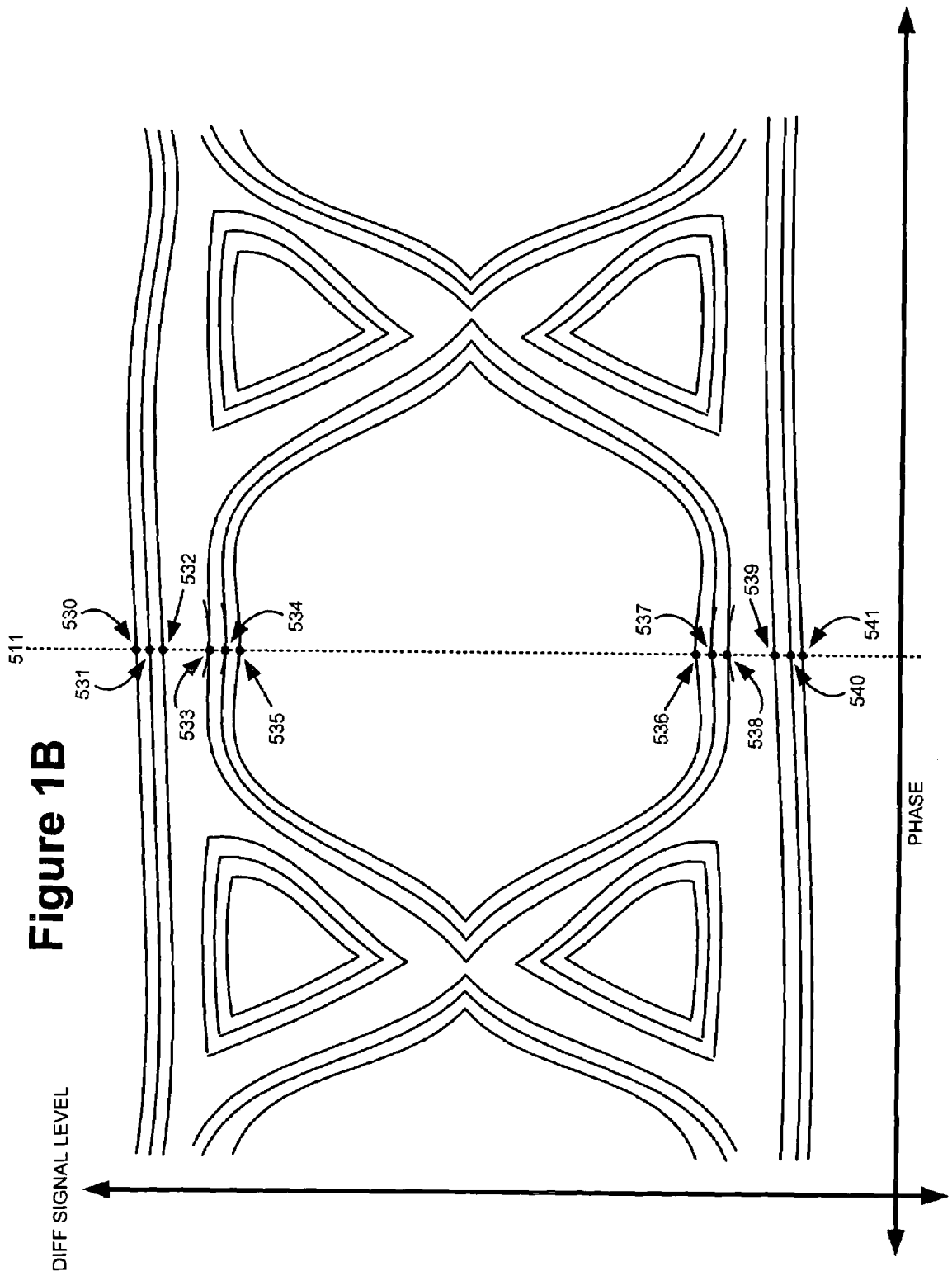
FIG. 1B depicts the same eye-diagram as shown in FIG. 1A, but with multiple slicer thresholds indicated for collection of a CDF.

Reference will now be made in detail to preferred embodiments of the invention, examples of which are illustrated in the accompanying drawings. Wherever possible, the same reference numbers will be used throughout the drawings to refer to the same or like parts.

Please refer to the Glossary of Selected Terms, included at the end of the Detailed Description, for the definition of selected terms used below.

| Table of Contents to Detailed Description |
|---|
| 1. Overview |
|   1.1. Simplified Eye-Diagram |
|   1.2. Collection of A CDF |
|   1.3. Determining A PDF |
|   1.4. Scanning Other Phases |
|   1.5. Other Periodic Patterns |
| 2. Modes Of Operation |
|   2.1. Overview |
|   2.2. Periodic Data |
|     2.2.1. Incoherent Sampling |
|     2.2.2. Coherent Sampling |
|   2.3. Non-periodic Data |
| 3. Example Hardware |
|   3.1. Overview |
|   3.2. Specifics |
|   3.3. CDV Collection Process |
| 4. Processes |
|   4.1. Producing A PDF |
|   4.2. Producing A CDF |
| 5. Further Details |
|   5.1. Changing The Slicer Level |
|     5.1.1. By Changing Slicer Threshold |
|     5.1.2. By Changing DC Offset Of Input Signal |
|   5.2. Example Computing Environment |
|   5.3. Color Mapping |
|   5.4. Deserializer Usage |
|   5.5. Data Structures |
|   5.6. Example APLL |
| 6. Glossary of Selected Terms |

1. Overview

The present invention relates to the collection of distribution functions, of a data signal, and to using such distribution functions to provide waveform information similar to that provided by a DSO (e.g., an "eye-diagram"). An advantage of distribution functions, over conventional approaches to waveform collection, is simplified analog-to-digital conversion. Where the objective is to collect waveform information on a data transceiver, such analog-to-digital conversion can be accomplished by the receiving slicer of such transceiver. To accomplish such analog-to-digital conversion, a slicer need only have the capability for programmably changing its threshold. Further, programmable slicer thresholding is already desirable in a transceiver for other reasons (e.g., offset cancellation and DFT). Beyond a programmable slicer level, additional hardware necessary for a transceiver, to provide a basis for collection of such waveform information, is minimal.

An overview of the present invention is presented in this section by way of an example. Discussion of particular hardware, that would permit for implementation of the example, is presented in a later section. The example begins with a simplified eye-diagram that is to be an end result of an application of principles of the present invention. Next, collection of a cumulative distribution function (CDF), at a particular phase of such desired eye-diagram, is presented. Conversion of such CDF into a probability distribution function (PDF), and illustration of how such PDF can represent a "slice" of the desired eye-diagram at a particular phase, is presented. The determination of PDFs for other phases, in order to create a complete eye-diagram, is presented.

1.1. Simplified Eye-Diagram

FIG. 1A depicts a simplified standard example eye-diagram for a binary signal. For purposes of this overview, it is assumed the data transmitted by the binary signal is periodic. The number of symbols, comprising one repetition of this data, shall be referred to herein as the "data_period." However, restricting the input signal to periodic data transmissions is only one mode of operation for the present invention. Additional modes are covered in following sections.

FIG. 1A shows a one-symbol-period eye-diagram, with a phase axis (501) and a differential signal level axis (502). Along the phase axis, a phase change of one symbol period is indicated by lines 510 and 512. Line 511 indicates the center-phase of the symbol period. Along the differential signal level axis, line 515 indicates the ideal differential signal level for a logic one, line 513 indicates the ideal differential signal level for a logic zero and line 514 indicates the midpoint between these two signal levels. During normal receiver operation, the phase and differential signal level of the slicer is adjusted to lie at the intersection of lines 511 and 514 (indicated as point 516).

A third dimension of an eye-diagram, which can be represented by intensity or color, can be used to depict the relative frequency with which traces occur at particular signal levels and phases. In FIG. 1A, this third dimension is represented in a simplified manner by dividing the eye-diagram into four different types of regions. Regions labeled 520 are areas where no signal traces occur. Conversely, regions labeled 523 are areas where signal traces are most likely to occur. In-between regions 520 and 523 are transitional areas 521 and 522. If ranked according to the likelihood with which traces can occur within it, these four types of areas can be ranked as follows:

520<521<522<523

Thus, for this example, areas 520 are directly adjacent to areas 521 and areas 523 are directly adjacent to areas 522. Areas 521, in addition to being directly adjacent to areas 520, are also directly adjacent to areas 522. Similarly, areas 522, in addition to being directly adjacent to areas 523, are also directly adjacent to areas 521.

1.2. Collection of A CDF

FIG. 1B depicts the same eye-diagram as shown in FIG. 1A. In FIG. 1B, a cumulative distribution function (CDF), at phase 511, can be collected as follows.

Rather than having the slicer threshold fixed at differential signal level 514, a "scan," of the differential signal level axis, can be performed. The scan can be accomplished in any appropriate order. Two potential orderings for scanning are to either begin at the top of the differential signal level axis, and proceed down, or it can begin at the bottom of the differential signal level axis and proceed upwards.

For each slicer threshold level of the scan, a fixed number of symbols (this number is referred to herein as "CDV_sample_size") can be analyzed in order to produce a value for the CDF. For purposes of this overview, it is assumed CDV_sample_size is an integer multiple of data_period.

The analysis of CDV_sample_size symbols can be accomplished as follows: count the number of times a particular symbol value occurs. Where the input signal is binary, the analysis is counting either the number of "one" symbols or the number of "zero" symbols. Each count of symbols of a particular value, over a total of CDV_sample_size symbols, is referred to herein as a "CDF value" (or "CDV") because it can add another value to a CDF.

Figure 2:
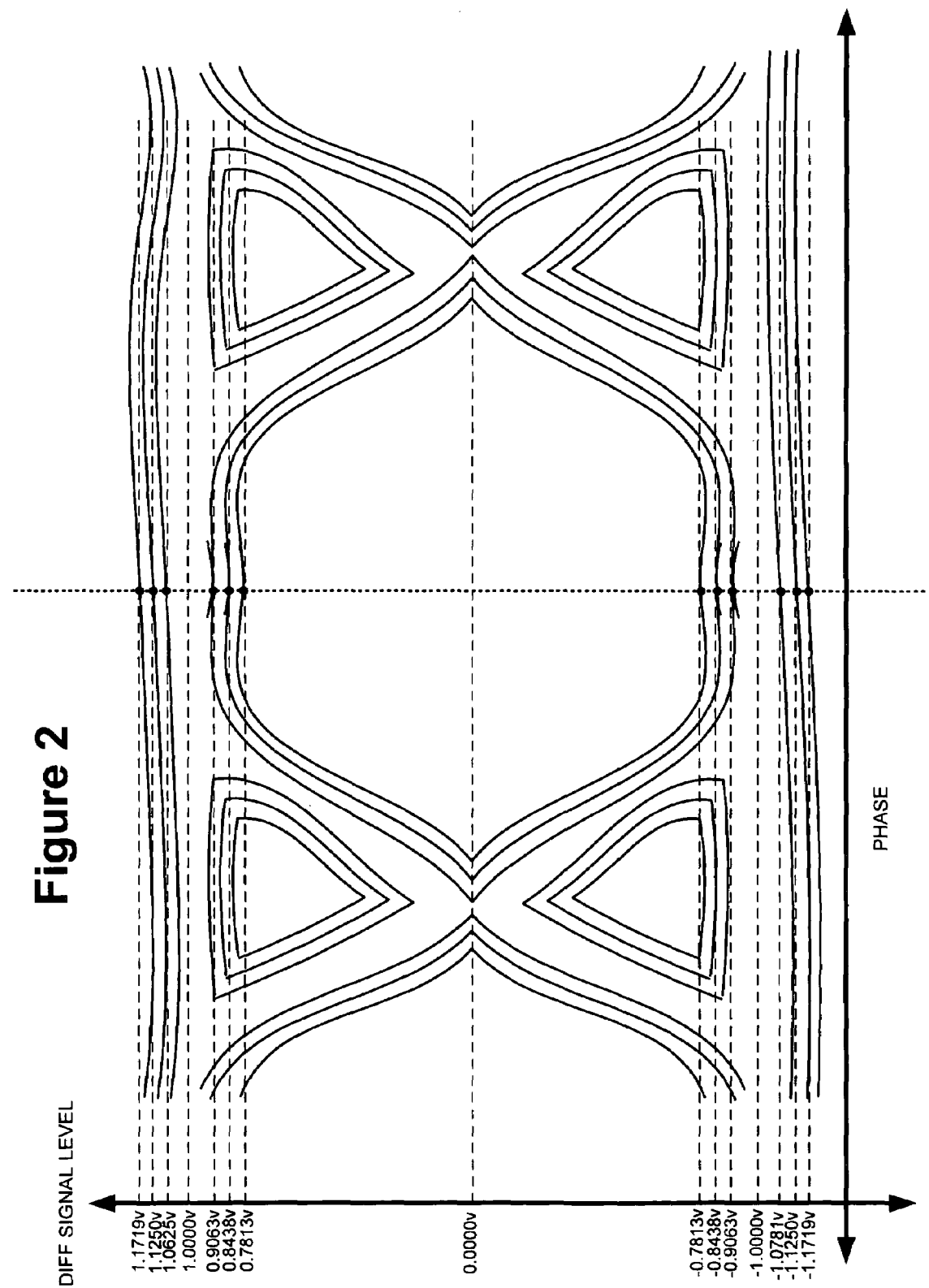
FIG. 2 depicts example slicer threshold voltages, corresponding to points 530 to 541 of FIG. 1B.

Key differential signal levels, for a scan of slicer thresholds at phase 511, are indicated in FIG. 1B by points 530 to 541. Example slicer threshold voltages, corresponding to points 530 to 541, are shown in FIG. 2. FIG. 2 is based on the assumption the ideal voltage level for a logic one is one volt and for a logic zero is minus one volt. It should be noted that equivalent to changing the slicer threshold is to shift the input signal with respect to a fixed slicing threshold.

If the slicing level is set at level 530 (see FIG. 1B), for example, then, for phase 511, all CDV_sample_size symbols are just below the slicing level and are therefore counted as zeros. If the slicing level is next set to level 531, then only those few symbols, of CDV_sample_size traces, that are in-between levels 530 and 531, are counted as a logic one, with all other symbols counted as zeros. As the slicing level proceeds downwards, along the differential signal level axis, the trend of recognizing more symbols as one, and less as zero, continues. Finally, at slicing level 541, all symbols, of CDV_sample_size symbols, are just above the slicing level and are therefore counted as ones.

A relationship between slicer level, and the number of symbols counted as one, for phase 511 of FIG. 1B, is plotted in FIG. 1C. Plot 542 of FIG. 1C can also be referred to as a CDF. Plot 542 is based upon the following assumptions. For every data_period symbols of the input signal, exactly half such symbols are "one" and half are "zero" (i.e., the input signal is perfectly "DC balanced"). If the number of integer multiples of data_period represented by CDV_sample_size is "data_period_multiple," the CDV_sample_size symbols, sampled for the determination of each CDV, represent data_period_multiple repetitions of the input signal's pattern.

As can be seen from FIG. 1C, when the slicer level is at 530, no symbols (or 0% of them) are counted as one's. When the slicer level is at 535 or 536, half the symbols (or 50% of them) are counted as one's. When the slicer level is at 541, all symbols (or 100% of them) are counted as the one's.

It will be assumed that the following four slicer level changes, of the upper part of the eye, are approximately equal: 530 to 531, 531 to 532, 533 to 534, 534 to 535. It will also be assumed that these four slicer level changes are approximately equal to the following four slicer level changes, of the lower part of the eye: 536 to 537, 537 to 538, 539 to 540, 540 to 541. It will be assumed that the following two slicer level changes are approximately equal: 532 to 533 and 538 to 539.

Due to general symmetry of the eye diagram, the change, in the percentage of symbols counted as one, is approximately equal for the following slicer level changes: 530 to 531, 534 to 535, 536 to 537 and 540 to 541. Also, due to general symmetry of the eye diagram, the change, in the percentage of symbols counted as one, is approximately equal for the following slicer level changes: 531 to 532, 533 to 534, 537 to 538 and 539 to 540. Finally, due to general symmetry of the eye diagram, the change, in the percentage of symbols counted as one, is approximately equal for the following slicer level changes: 532 to 533 and 538 to 539.

1.3. Determining A PDF

The relationship between slicer level, and the change in the number of symbols counted as one, for phase 511 of FIG. 1B, is depicted as plot 543 in FIG. 1D. Plot 543 can also be referred to as a probability distribution function (PDF). For reference, CDF plot 542 is also shown in FIG. 1D. The PDF can be found by determining the difference between successive points of the CDF. Alternatively, the PDF is the derivative of the CDF.

Figure 1E:
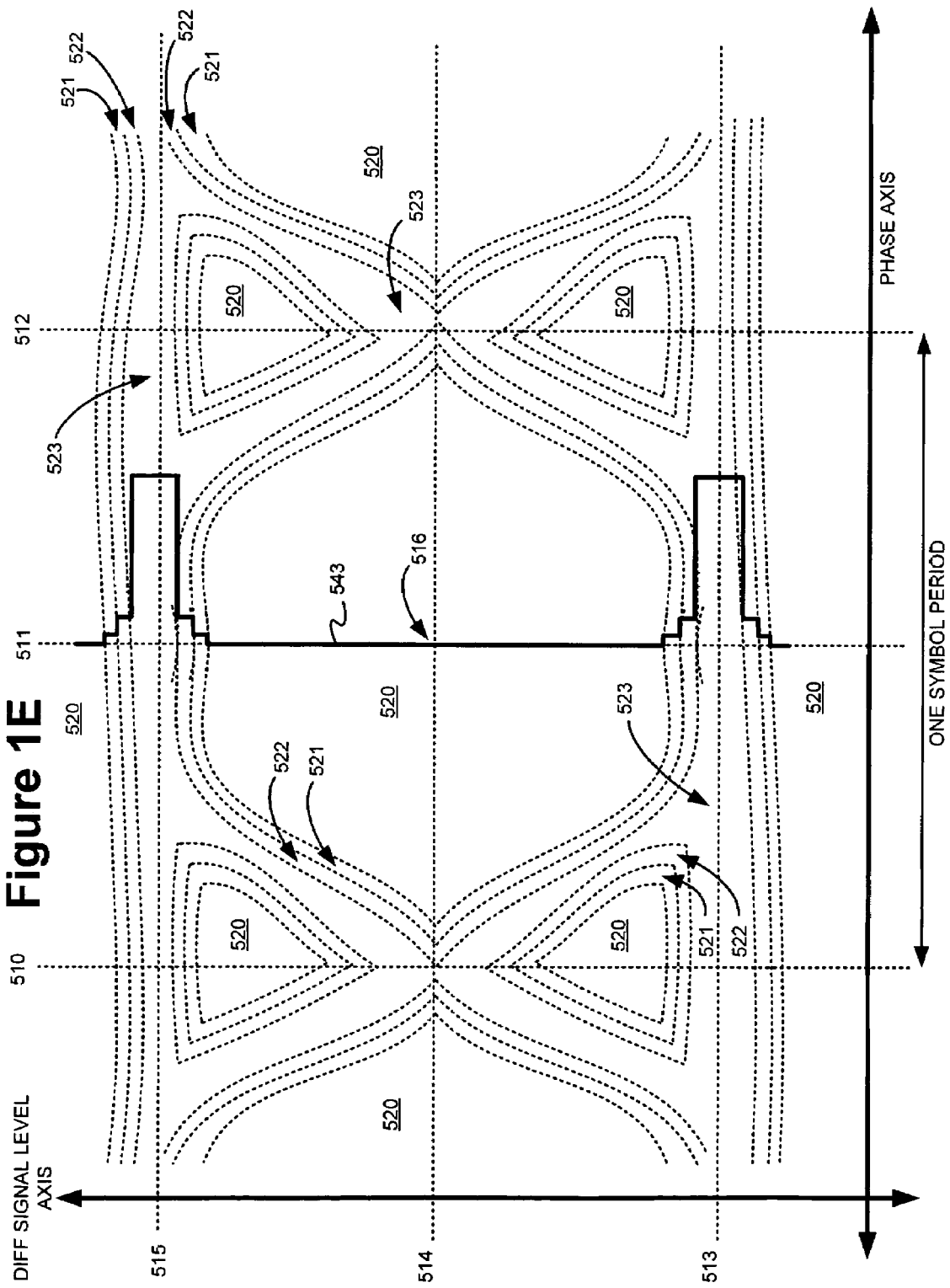
FIG. 1E places a PDF plot 543 at phase 511 of the eye-diagram introduced by FIG. 1A.

In FIG. 1E, the PDF plot 543 is placed at phase 511 of the eye-diagram introduced by FIG. 1A. As can be seen, the PDF introduces a third dimension, at phase 511, that can be represented by, for example, intensity or color mapping.

1.4. Scanning Other Phases

The above procedure demonstrated the technique for finding the PDF at a single phase (e.g., phase 511), in order to represent a single vertical slice through an eye diagram. By moving the phase to other positions along the eye period, and applying the above procedure at each new phase location in the same manner as shown above for phase 511, the eye diagram of FIG. 1A can be produced in its entirety. The phase positions may be scanned in any order when constructing the eye diagram. Possible approaches include, but are not limited to: scanning left to right, scanning right to left or scanning coarse to fine (i.e., change the phase by large steps first and by smaller steps later).

1.5. Other Periodic Patterns

While the above example presents an input signal where the periodic data is half one's and half zero's, over each data_period of symbols, this need not be the case. In general, the data of the input signal need only be periodic and can be of any ratio regarding the types of symbols contained therein. For example, if the input signal, for each data_period, is 60% one's and 40% zero's then, a modified form, of CDF plot 542, is produced. For example, between levels 535 to 536, a modified plot 542 would indicate 60% rather than 50%. Since the input to be represented is changed, a modified CDF plot 542, when converted into a PDF for phase 511, would still provide a correct eye-diagram representation.

2. Modes Of Operation

2.1. Overview

Section 1 ("Overview") presents an example mode of operation of the invention where periodic data is sampled to create an eye-diagram. To more fully describe this mode, as well as other modes of invention operation, it is useful to present additional timing information. This subsection presents such timing information while the following subsections each address a particular mode of operation.

In order that an input signal be reliably sampled at a particular phase, to detect the occurrence of CDV_sample_size symbols for collection of a CDV, the input signal and sample clock can be made synchronous to a reference clock. Given a synchronous relationship, a sample clock edge (or SCE) has a certain offset phase, referred to herein as a "symbol offset phase," with respect to the symbol of the input signal it samples.

Figure 3A:
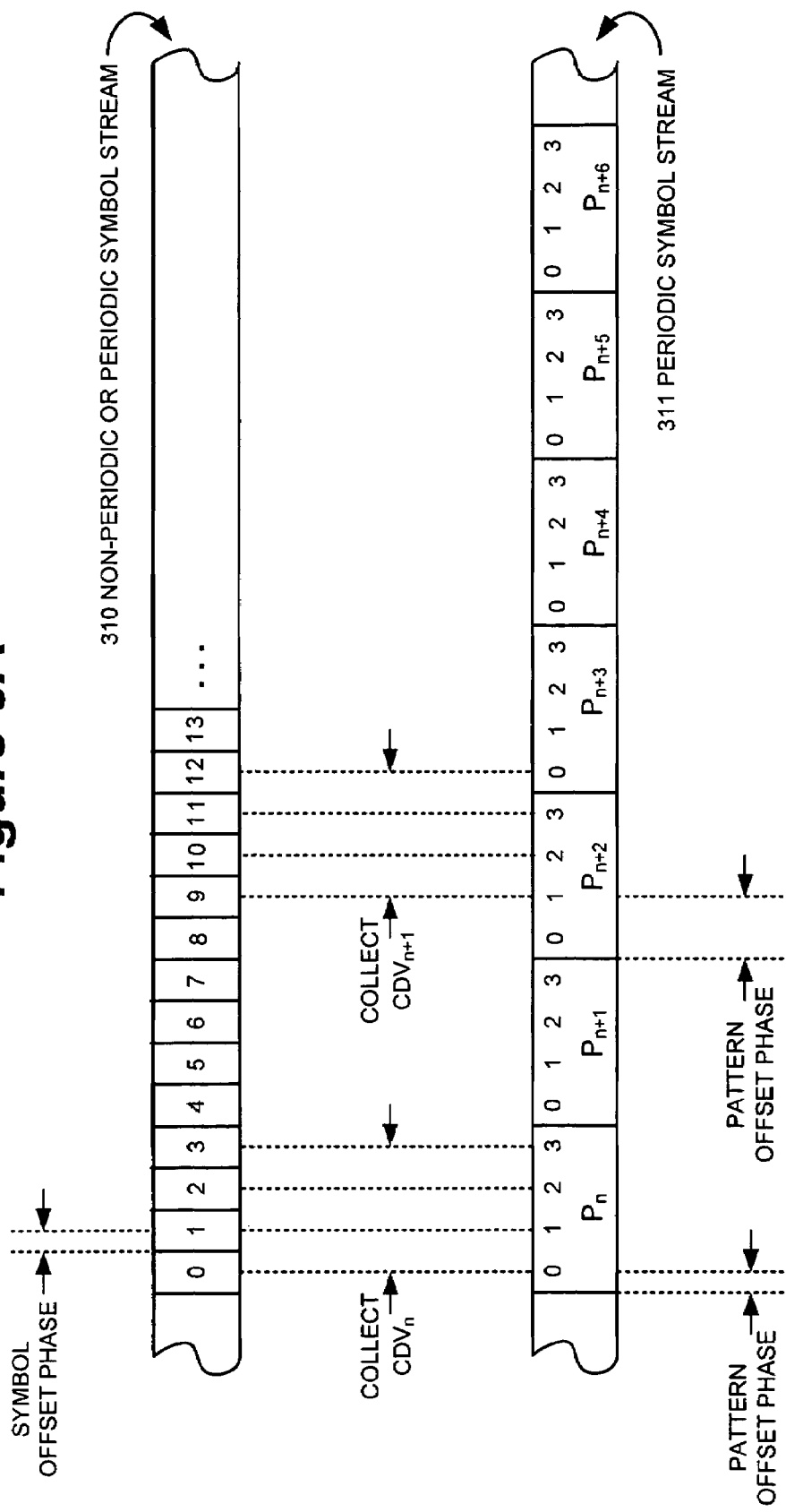
FIG. 3A shows example input signals as streams of sequentially labeled symbols.

FIG. 3A shows an example input signal as a stream of sequentially labeled symbols 310, that may or may not be periodic, and a stream of periodic symbols 311. For purposes of illustration, FIG. 3A depicts a case where each CDV is based on the occurrence of only four symbols (i.e., it depicts the case where CDV_sample_size is four). Further, it is assumed that the data_period of symbol stream 311 is four-symbols (and therefore data_period_multiple is one). The group of SCEs, that sample each of the CDV_sample_size symbols for a particular CDV, shall be referred to herein as CDV_sampling_edges. Two groups of CDV_sampling_edges are shown in FIG. 3A: a group to collect $CDV_n$ and a group to collect a $CDV_{n+1}$. In FIG. 3A, each SCE, of each CDV_sampling_edges group, has a symbol offset phase that is halfway through the temporal extent of its respective symbol.

A symbol stream, such as 310, can either be periodic or non-periodic, and it will still have a certain symbol offset phase with respect to its SCEs. For the SCEs to have a pattern offset phase, however, in addition to having a symbol offset phase, a symbol stream needs to be periodic. The example periodic symbol stream 311 of FIG. 3A is comprised of a four-symbol pattern, with the symbols of the pattern labeled 0 to 3. The CDV_sampling_edges, for $CDV_n$, is shown as beginning halfway through symbol 0 of pattern repetition $P_n$. The CDV_sampling_edges, for $CDV_{n+1}$, is shown as beginning halfway through symbol 1 of pattern repetition $P_{n+2}$.

2.2. Periodic Data

Sampling of a periodic input signal can be accomplished in at least the following ways.

2.2.1. Incoherent Sampling

Incoherent sampling can be characterized by its ability to capture an eye-diagram (in which the various types of transitions that occur, over a symbol interval, are overlaid).

For the present invention, incoherent sampling can be accomplished as follows. Within each group of CDV_sampling_edges, there is a group of SCEs (referred to herein as "data_period_edges") for each repetition of the periodic data. Thus, there are data_period_multiple groups of data_period_edges in each group of CDV_sampling_edges. Each group of data_period_edges can sample as follows: each of its SCEs has a unique corresponding symbol, of a repetition of the input pattern, that it samples. Such sampling can be achieved by any appropriate method.

One example approach is shown in FIG. 3A with respect to symbol stream 311, where the period, for sampling symbols for tabulation in a CDV, is the same as the underlying data rate. A disadvantage of this approach, however, is that symbol counting needs to be done at the same rate as the input data stream. For very high speed data streams, synthesizing logic to count at this frequency can be difficult.

Another example approach is shown in FIG. 3B. Here, the period, for sampling symbols for tabulation in a CDV, is prime with respect to the length of an input data pattern. In FIG. 3B, for example, the length of the pattern is four symbols, but only one of every five SCEs is used to sample a symbol of the input stream. This results in the following sequence of pattern sampling. For repetition $P_n$ symbol 0 is sampled for $CDV_n$, for repetition $P_{n+1}$ symbol 1 is sampled for $CDV_n$, for repetition $P_{n+2}$ symbol 2 is sampled for $CDV_n$ and for repetition $P_{n+3}$ symbol 3 is sampled for $CDV_n$. Repetition $P_{n+4}$ is not sampled. Beginning with repetition $P_{n+5}$, the same sampling pattern repeats for $CDV_{n+1}$ as occurred for $CDV_n$.

2.2.2. Coherent Sampling

Coherent sampling can be characterized by its ability to reconstruct a pattern, or a portion of a pattern, as a signal. For the present invention, coherent sampling can be accomplished as follows. For each group of CDV_sample_edges, each of its member SCEs has the same pattern offset phase (as well as the same symbol offset phase).

Such fixed pattern offset phase can be achieved if the period, for sampling symbols for tabulation in a CDV, is the same as (or is an integer multiple of) the length of an input data pattern. An example of this is shown in FIG. 3C where each SCE samples symbol 1 of a pattern repetition. The first SCE, for collection of a $CDV_n$, is assumed to occur during symbol 1 of pattern repetition $P_n$. The second SCE occurs four symbol times after the first SCE, during symbol 1 of pattern repetition $P_{n+1}$. The third SCE occurs eight symbol times after the second SCE, during symbol 1 of pattern repetition $P_{n+3}$. The fourth SCE occurs twelve symbol times after the third SCE, during symbol 1 of pattern repetition $P_{n+6}$. As can be seen, each SCE, for the collection of $CDV_n$, occurs halfway through the temporal extent of a symbol 1.

2.3. Non-Periodic Data

Even if the data of the input signal is non-periodic, the present invention can still be used, provided certain other limitations are met. In general, an eye diagram can be formed so long as the following condition is satisfied by the input data: over each occurrence of CDV_sample_size symbols, the percentage occurrence, of each symbol value, remains the same (or at least approximately the same).

The percentage occurrence, of each symbol value, remains approximately the same when the input data is any of the following: code space balanced, pseudo-random balanced or random. Code-space based balancing, and pseudo-random balancing, are typically used to achieve DC balancing. An example of code-space based balancing is "8B10B" coding. An example of pseudo-random balancing is as follows: pseudo-random data is added to the data before transmission and the same pseudo-random data is added again after transmission.

To the extent the percentage occurrence of each symbol value varies, over successive CDV determinations, noise is introduced into the resulting eye-diagram. Such noise can be particularly visible in those areas of the eye-diagram where no signal levels actually occur, such as in the central "eye" of an eye-diagram.

For example, if CDV_sample_size is set to 1000 bits then, on average, one would expect a CDV, of the central "eye," to have a value of 500 (i.e., either 500 ones or 500 zeros counted). However, any particular sequence of 1000 bits need not have exactly 500 ones and 500 zeros. The result of this variation is that CDVs, at successive slicer levels, can vary slightly above or slightly below 500. When differences between such CDVs are determined, for CDF to PDF conversion, the results are not zero, even though they should be. These close-to-zero, but non-zero, values cause the resulting eye-diagram to have erroneous visual artifacts.

Such noise can be reduced by counting as zero those PDF values below a certain threshold. If the extent of variation, of the percentage occurrence of each symbol value, cannot be bounded, however, then it is not possible to completely eliminate such noise.

Sampling of non-periodic data can be accomplished upon each successive symbol, as shown for non-periodic symbol stream 310 of FIG. 3A. Alternatively, symbols can be skipped between samplings of the non-periodic symbol stream. For example, the sample timings of FIGS. 3B and 3C can be used, where the periodic symbol stream 311 is replaced with non-periodic symbol stream 310.

If the non-periodic symbol stream is code-space based balanced, and if each successive symbol of the non-periodic symbol stream is sampled (as is shown in FIG. 3A), then the extent of variation, of the percentage occurrence of each symbol value, can be bounded. If such CDVs are sufficiently rounded, it can be ensured that CDVs that should be exactly the same are exactly the same. The rounding creates a quantization noise, whose magnitude is inversely proportional to the CDV period (i.e., CDV_sample_size). If CDV_sample_size is large enough, the quantization noise introduced by the rounding can be less than the noise introduced by the color mapping.

3. Example Hardware

This section presents example hardware for implementation of the present invention. The first subsection (3.1 "Overview") focuses on those aspects of the hardware that are general to differential data transmission. The second subsection (3.2 "Specifics") discusses those aspects of the hardware that are less generic.

3.1. Overview

Figure 4A:
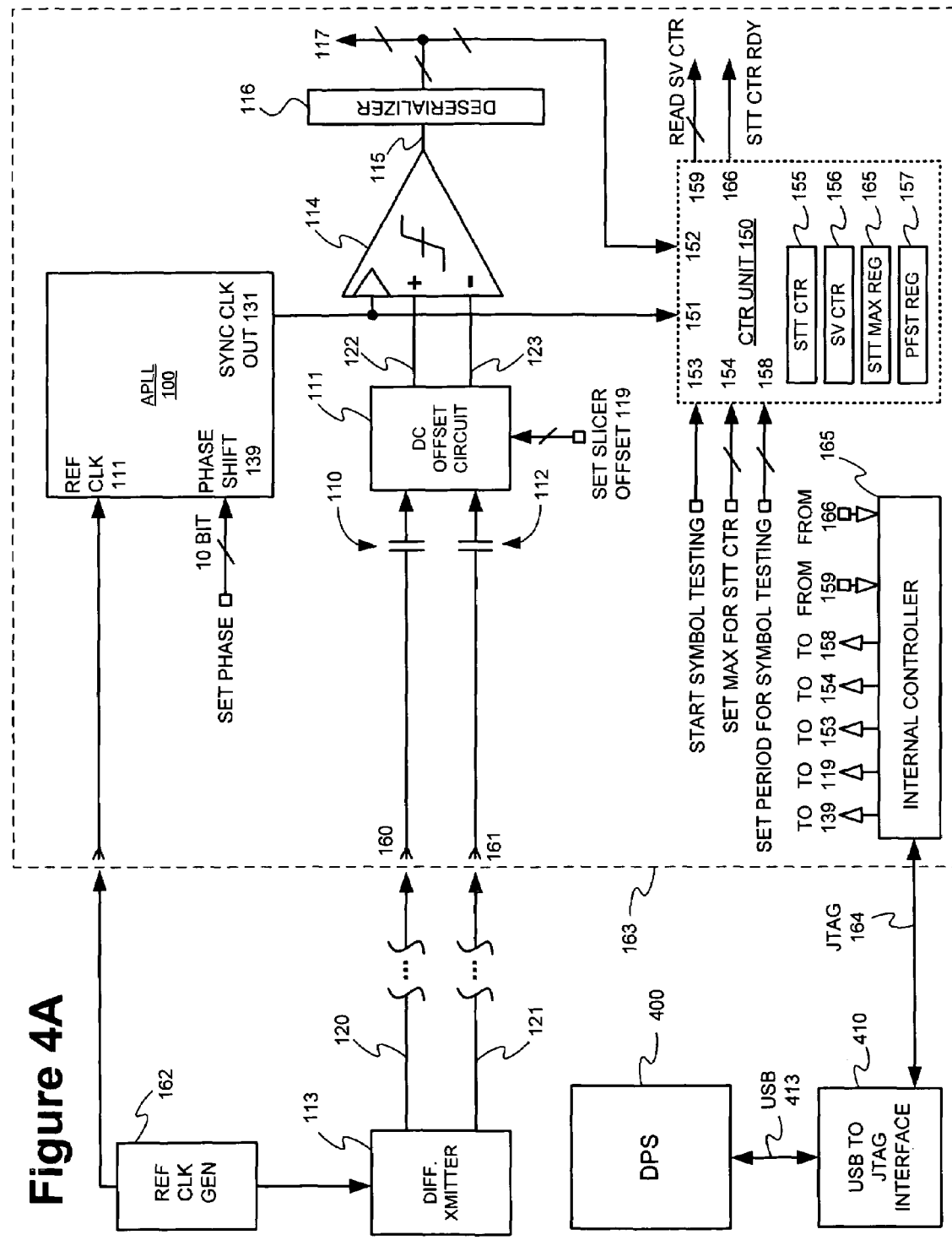
FIG. 4A depicts an example system for differential data transmission over pair of conductors (or "a differential pair") 120 and 121.

FIG. 4A depicts an example system for differential data transmission over pair of conductors (or "a differential pair") 120 and 121. A differential transmitter 113 transmits data to a receiver indicated by dashed outline 163. Outline 163 indicates sub-systems that can be integrated on a single, physically contiguous, integrated circuit (IC). IC 163 can be a transceiver. The data symbols transmitted to IC 163 can be in any suitable format (e.g., binary or PAM 4). Conductors 120 and 121 can couple to IC 163 at points 160 and 161. Differential transmitter 113 can transmit in synchronization with a reference clock 162. Reference clock 162 can also be applied to IC 163.

IC 163 can also have a port (e.g., JTAG port 164) for coupling to a data processing system (DPS) 400 where the distribution functions can be determined. "JTAG" refers to the "Joint Test Action Group" that developed the IEEE 1149.1 boundary-scan standard. JTAG port 164 can first couple to a USB-to-JTAG interface 410 and interface 410 can then couple to DPS 400 via USB connection 413. JTAG port 164 can couple to an internal controller 165, located on IC 163. Internal controller 165 can provide a means by which DPS 400 can issue commands, or send data to, sub-systems of IC 163. Also, internal controller 165 can provide a means by which DPS 400 can poll, or receive data from, sub-systems of IC 163.

Figure 4B:
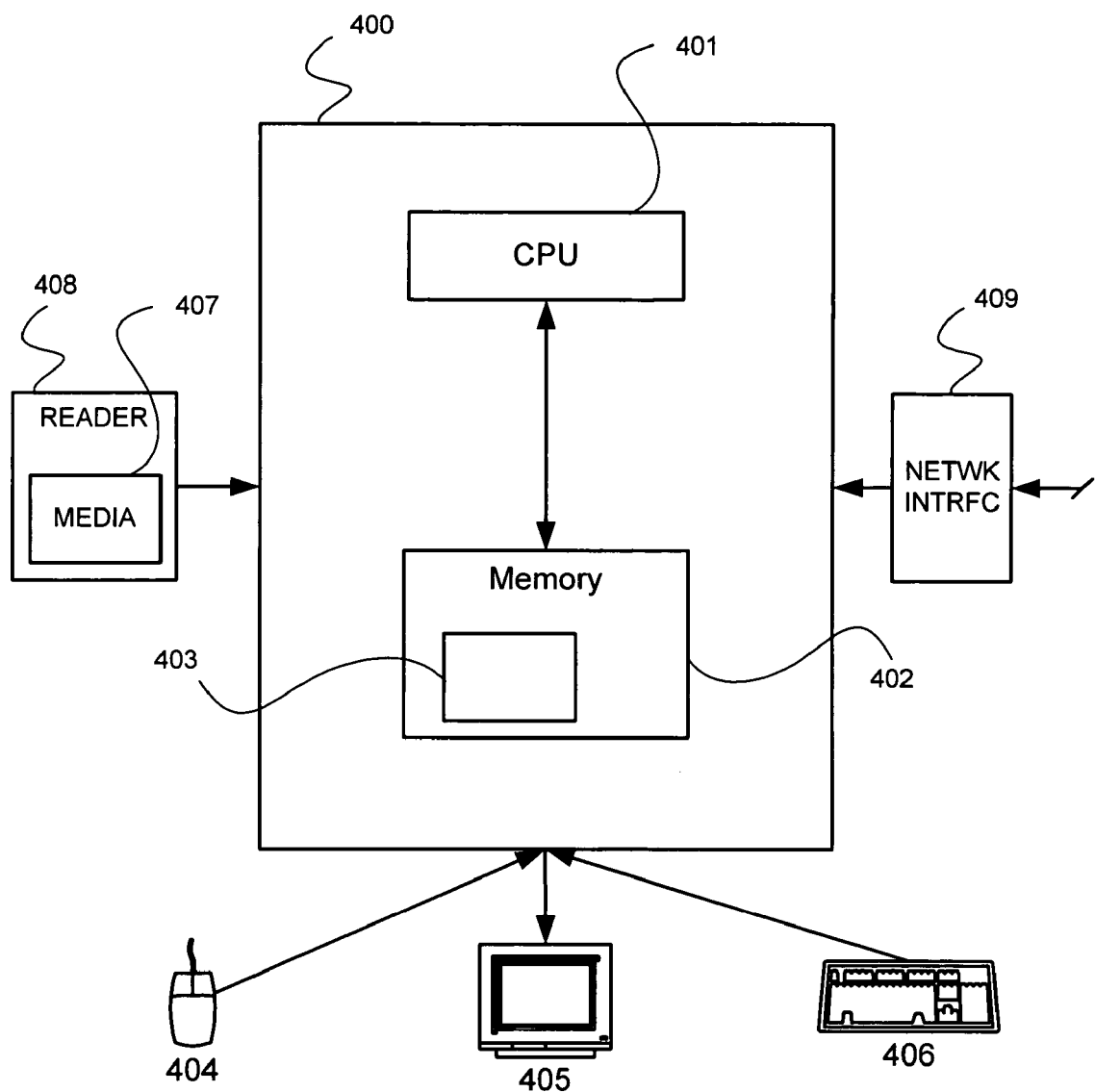
FIG. 4B depicts a type of data processing system known as a personal computer.

Data Processing System 400 can be any stored-program computer. Please see below section "Further Details" for more information. FIG. 4B depicts DPS 400 as a type of data processing system known as a personal computer. Additionally, when the present invention is to be included as a feature of "silicon IP" (i.e., is included in a design intended for use in multiple, independent, IC design projects), the EDA tools using such silicon IP can be executed on a system such as DPS 400.

IC 163 can be designed to recover the clock, for sampling of the input data on conductors 120 and 121, from the input data itself. An IC capable of this can include subsystems to perform "clock and data recovery" (CDR). An analog PLL ("APLL"), such as APLL 100, can be part of a CDR. APLL 100 can produce a clock 131 that is synchronized to reference clock 162. APLL 100 can also include a phase shift input (e.g., phase shift input 139) to allow for adjustment of clock 131 relative to the sample clock recovered from the received data. More details, on the operation of an example APLL, can be found in the below section 5.6: "Example APLL." Clock 131 can be used to clock receiver 114 such that receiver 114 operates synchronously with respect to the differential data received over conductors 120 and 121.

A deserializer, such as deserializer 116 of FIG. 4A, can be part of the CDR for IC 163. Deserializer 116 receives bits from receiver 114 and assembles them into words. Deserialized data (available at output 117) can be used as part of CDR circuitry (not shown) that analyzes data and clock information, extracted from the input data signal, for purposes of determining whether to increase or decrease sample clock 131.

Receiver 114 can have a differential pair as input (e.g., input nodes 122 and 123) and can produce appropriate logic levels at its output (e.g., output node 115). Receiver 114 can be a comparator that outputs a signal level corresponding to a logic one if a signal level (e.g., a voltage) at its positive (or "+") input is greater than a signal level at its negative (or "−") input. Conversely, receiver 114 can output a signal level corresponding to a logic zero if a signal level at its negative input is greater than a signal level at its positive input.

Coupling capacitors (e.g., capacitors 110 and 112) can be placed between the transmitter 113 and receiver 114. For example, under the "PCI EXPRESS" standard, coupling capacitors are used. PCI EXPRESS is administered by the PCI Special Interest Group, Portland, Oreg., U.S.A.

A DC offset circuit 111 can also be placed between the transmitter 113 and receiver 114. DC offset circuit 111 can be used to shift the differential signal level of the DDT received by receiver 114. DC offset circuit 111 can be included on a transceiving IC for a variety of applications. Some examples include the following: determination a differential signal level that results in a particular bit error rate and determination of differential signal margin. Such applications are presented in the 0603 Application.

While receiver 114 is depicted as a single comparator, it can be readily appreciated that multiple comparators can be appropriate. For example, it is not uncommon to have at least a pair of comparators: one for clock recovery from the data signal and one for data recovery from the data signal. Multiple pairs of such comparators can be appropriate when the frequency, of data signal to be received, is very high.

3.2. Specifics

This subsection focuses the following less generic aspects of IC 163: a programmable slicer level, a non-CDR controlled phase control input and symbol counters. Each of these aspects is discussed below.

The receiver input comparator (i.e., its "slicer") can be provided with a programmable threshold for distinguishing between symbols. When the slicer is used for a binary signal (e.g., slicer 114 of FIG. 4A), it can slice at arbitrary voltage levels, rather than just at the middle of the data eye. A variable slicer level can be achieved in at least three ways. First, the input signal can be shifted relative to the slicing level of the comparator. In FIG. 4A, such relative shifting of the input signal can be accomplished with DC offset circuit 111. The data processing system can control DC offset circuit 111 by having internal controller 165 issue an appropriate offset level on lines 119. Second, the slicing level can be shifted relative to the input signal. Third, both the input signal and the slicing level can be shifted. These approaches are discussed in greater detail in section 5.1: "Changing The Slicer Level."

The phase control input, of the receiver's CDR unit, can be put under "manual" control such that the phase, for which a CDV is to be collected, can be selected. In the example of FIG. 4A, the CDR includes an APLL 100 that has a phase shift input 139 for selecting the phase of each CDV collected. The data processing system can control the phase shift of APLL 100 by having internal controller 165 specify an appropriate phase shift on lines 139.

The following symbol counters and registers can be added to a receiver. Each symbol of the input stream, whose value is tested, can be counted by a "symbol-to-test counter" (or "STT counter 155" in FIG. 4A). The maximum count to be reached by STT counter 155 can be loaded into a "maximum for STT counter" register (or "STT max reg" 165 in FIG. 4A). The period, for testing symbols of the input stream, can be determined by the value loaded into a "period-for-symbol-testing" register (or "PFST reg 157" in FIG. 4A). The number of times a tested symbol resolves to a particular value (e.g., for a binary signal the symbol can be of value "1" or "0") can be counted by a "symbol value counter" (or "SV counter 156" in FIG. 4A).

3.3. CDV Collection Process

Counter unit 150 can be operated as follows, by DPS 400, to effect collection a CDV. The process is depicted in FIG. 5C. It assumes the phase has already been set at phase shift input 139 of APLL 100 and the slicer level has already been set at slicer offset input 119. Example processes for scanning the phase and slicer levels are described in below section 4: "Processes."

The process can begin with DPS 400 setting input "start symbol testing" 153 to a low value that can cause STT counter 155 and SV counter 156 to be reset to zero. Step 530.

A maximum count value, for STT counter 155, can be programmed, through lines 154, into "STT max reg" 165. Step 531.

The period, for testing symbols of the input stream, can be programmed through lines 158 into "PFST reg" 157. Step 532. Implementation, of the period for testing symbols of the input stream, can be accomplished in conjunction with deserializer 116. Deserializer 116 can operate in conjunction with counter unit 150 through its coupling at input 152. A discussion of how a deserializer can be used to lengthen the testing period is presented in below section 5.4: "Deserializer Usage." Setting the period for testing symbols of the input stream to longer than the period for successive symbols of the input data has the following advantage. It allows the counters of counter unit 150 to operate at a lower frequency. Lower frequency data can be processed by, for example, slower (and therefore less expensive) digital logic.

Also, as discussed above (section 2 "Modes Of Operation"), if the input data is periodic, appropriately setting the period for testing symbols of the input stream allows for the desired mode of signal sampling (e.g., incoherent or coherent) to be selected.

Input "start symbol testing" 153 can be set high, to enable STT counter 155 and SV counter 156 to begin counting. Step 533. STT counter 155 can advance in conjunction with the availability of data from deserializer 116. As data becomes available from deserializer 116 it can also be tested for an appropriate value to advance SV counter 156. When STT counter 155 reaches the value of STT max register 165, further counting by STT counter 155 and SV counter 156 can be disabled. Also, the "STT counter ready" output line 166, of counter unit 150, can be asserted. This can cause the data processing system to read the count on symbol value counter 156 though output 159 of counter unit 150.

Step 534 depicts an approach where DPS 400 polls whether counting is complete (e.g., whether "STT counter ready" 166 is asserted) and, if the counting is complete, DPS 400 reads the count of particular-valued symbols (e.g., the value of symbol value counter 156) at step 535.

For a next CDV, the process can be repeated by, once again, setting "start symbol testing" 153 low.

4. Processes

This section presents example processes for production of distribution functions in accordance with the present invention. In terms of the previous section (section 3, "Example Hardware"), the processes of the present section can be executed on a data processing system operating in conjunction with IC 163.

4.1. Producing A PDF

Figure 5A:
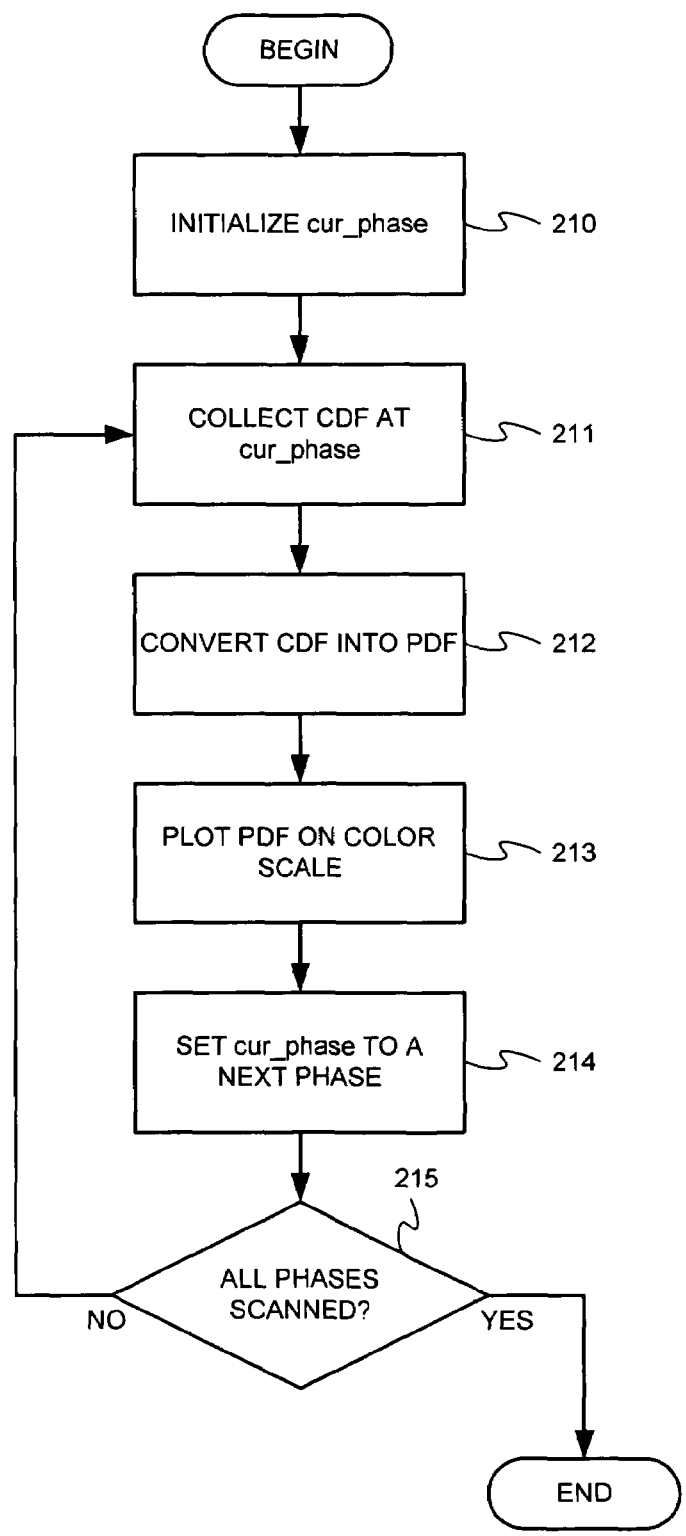
FIG. 5A depicts an example process for producing a PDF for each phase of an eye-diagram.

FIG. 5A depicts an example process for producing a PDF for each phase of an eye-diagram.

The process begins by initializing the current phase (called "cur_phase") at which a PDF is to be collected. Step 210. In terms of FIG. 4A, this can comprise DPS 400 issuing a command to set the appropriate initial phase at phase shift input 139 of APLL 100.

A cumulative distribution function (CDF) for cur_phase is collected. Step 211. Further detail on step 211 is provided in FIG. 5B which is discussed in the below subsection 4.2 ("Producing A CDF").

By taking the derivative of the CDF, its PDF can be found. Step 212.

The PDF can be converted into an appropriate color scale for viewing. Step 213. Any appropriate color mapping technique, such as those that have been developed for DSOs, can be used. A discussion of color mapping can be found in the below section 5.3: "Color Mapping."

The next phase, for collection of a CDF, can be determined. Step 214. Once again, in terms of FIG. 4A, DPS 400 can issue a command to set the appropriate next phase at phase shift input 139 of APLL 100.

If all phases, for production of the desired eye-diagram, have been scanned, then end production of the eye-diagram (i.e., take the "yes" branch of decision point 215). Otherwise, loop back to collection of another CDF at cur_phase (i.e., the "no" branch of decision point 215 is followed back to step 211).

It should be noted that any appropriate variation, of the process of FIG. 5A, can be used. Either, or both, or steps 212 and 213 can be moved to after the loop (comprised of steps 211, 214 and 215) in which CDFs are collected. Additionally, any appropriate strategy, for scanning the phases, can be used. For example, it can be advantageous to first do a "coarse"

scan, that covers the range of all phases of interest, in order to quickly produce a complete eye-diagram. Successive phase scans can be done, in-between the coarse scan, to further refine the resolution of the eye-diagram.

4.2. Producing A CDF

Figure 5B:
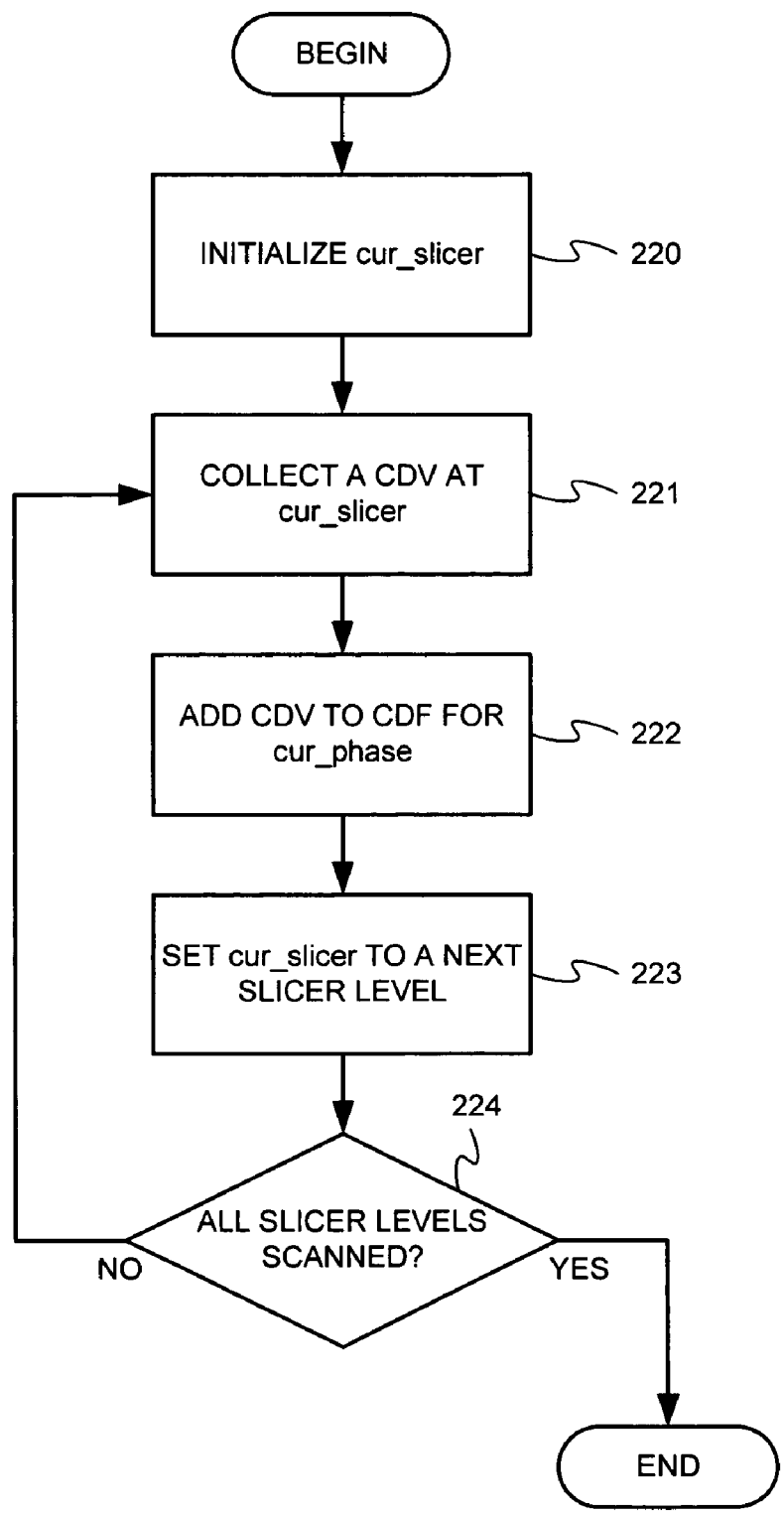
FIG. 5B depicts a process for step 211 of FIG. 5A: the collection of a CDF at a particular phase.

FIG. 5B depicts a process for step 211 of FIG. 5A: the collection of a CDF at a particular phase.

The receiver's slicer level is set to an initial value, where the current slicing level is represented as "cur_slicer." Step 220. The initial value for cur_slicer can be either a maximum slicer level or a minimum slicer level. A maximum slicer level can be a level greater than the maximum amplitude of the input signal, while the minimum slicer level can be a level less than the minimum amplitude of the input signal. In terms of FIG. 4A, setting the slicer level can comprise DPS 400 issuing a command to set the appropriate initial level at slicer offset input 119 of DC Offset Circuit 111.

A cumulative distribution value (CDV) can be collected for the current slicer level. Step 221. A process for collection of a CDV, at preset phase and slicer levels, is depicted in FIG. 5C and discussed in the above section 3.3: "CDV Collection Process."

The current CDV can be added to the CDF for cur_phase. Step 222. The CDF, for a current value of cur_phase, can be organized as an array of values. Each index of the array can correspond to a setting of the slicer level. A further discussion of suitable data structures is presented in below section 5.5: "Data Structures."

The receiver's slicer level can be set to a next value for collection of a CDV. Step 223. In terms of FIG. 4A, setting the slicer level can comprise DPS 400 issuing a command to set the appropriate next level at slicer offset input 119 of DC Offset Circuit 111.

If all slicer levels, for production of a CDF at a particular phase, have been scanned, then end production of the CDF (i.e., take the "yes" branch of decision point 224). Otherwise, loop back to collection of another CDV at cur_slicer (i.e., the "no" branch of decision point 224 is followed back to step 221).

5. Further Details

5.1. Changing the Slicer Level

As discussed above, a variable slicer level can be achieved in at least two ways that can be used individually or in combination. In this section each approach is addressed in more detail.

5.1.1. By Changing Slicer Threshold

The slicing level can be shifted relative to the input signal as follows.

In FIG. 4A, DC offset circuit 111 can be removed and comparator 114 can be directly coupled to inputs 160/161. The plus and minus inputs to comparator 114, as shown in FIG. 4A, can be referred to as the plus and minus "data inputs" of comparator 114. To these two inputs to comparator 114 can be added the following two inputs: plus and minus offset inputs (not shown in FIG. 4A).

The plus and minus offset inputs can be used for offset cancellation in normal operation, but can also be skewed to alter the trip point of the slicer. The slicer can compare the plus data input, combined with the plus offset input, to the minus data input combined with the minus offset input. By simultaneously changing the plus and minus offsets in different directions (i.e., increasing the plus offset while decreasing the minus offset, or decreasing the plus offset while increasing the minus offset) a change in the slicing level can be achieved.

5.1.2. By Changing DC Offset of Input Signal

The input signal can be shifted relative to the slicing level of the comparator. Such relative shifting of the input signal can be accomplished with a DC offset circuit, such as DC offset circuit 111.

A DC offset circuit can change the DC offset of a differential signal by differentially shifting the DC offset of each signal of its differential pair. In general, a shift of differential signal offset occurs whenever the change in DC offset to one signal of a differential pair is different in sign and/or magnitude from the change to DC offset of the other signal.

Figure 6A:
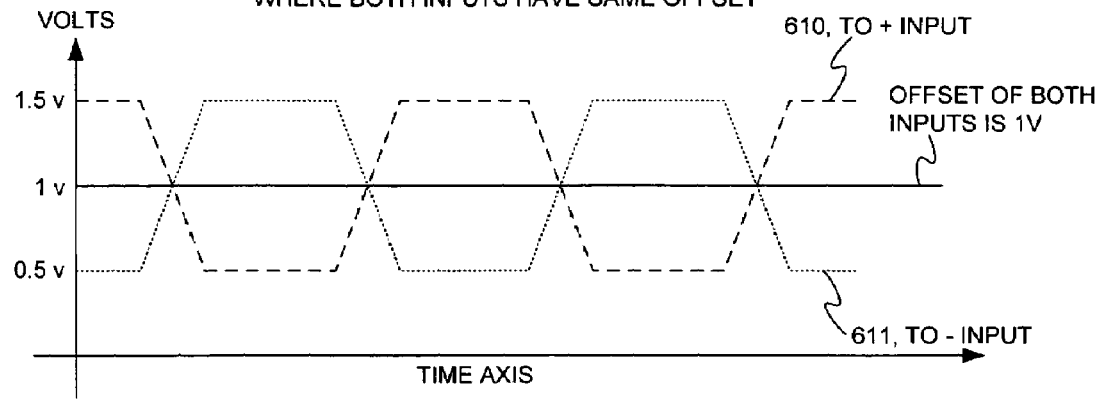
FIG. 6A depicts an example binary-coded DDT as received by a receiver 114 (of FIG. 4A).
Figure 6B:
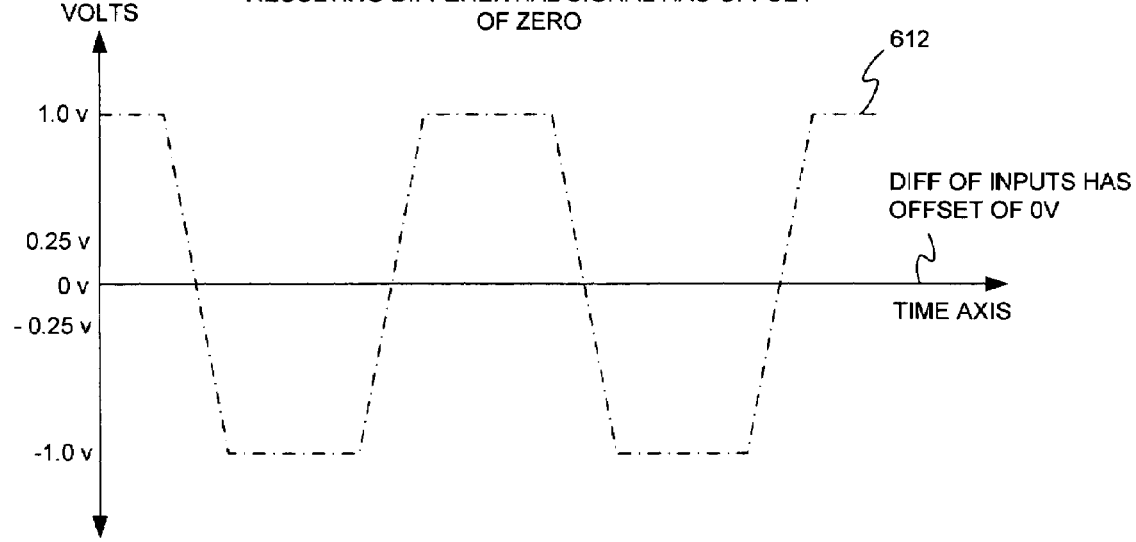
FIG. 6B depicts the difference (or differential signal) 612 of the two signals of FIG. 6A.

FIG. 6A depicts an example binary-coded DDT as received by a receiver 114 (of FIG. 4A). A signal 610 is the positive input of receiver 114 while a signal 611 is the negative input of receiver 114. Signals 610 and 611 have the same amplitude and frequency, but are 180 degrees out of phase. Signals 610 and 611 have been set, by DC offset circuit 111, to have the same average amplitude (or DC offset). For the example of FIG. 6A, each signal has a 1.0 volt DC offset, with peak values of 0.5 volts and 1.5 volts. FIG. 6B depicts the difference (or differential signal) 612 of the two signals of FIG. 6A. As can be seen, since both signals, of the differential pair, have the same offset, the differential signal has an offset of zero.

Receiver 114 outputs a logic one when the differential signal is greater than zero and a logic zero when the differential signal is negative. A positive differential signal indicates the positive input to receiver 114 has a greater signal level than the negative input to receiver 114, which is a sufficient condition to cause receiver 114 to produce a logic one. Conversely, a negative differential signal indicates the negative input to receiver 114 has a greater signal level than the positive input to receiver 114, which is a sufficient condition for receiver 114 to produce a logic zero.

Figure 7A:
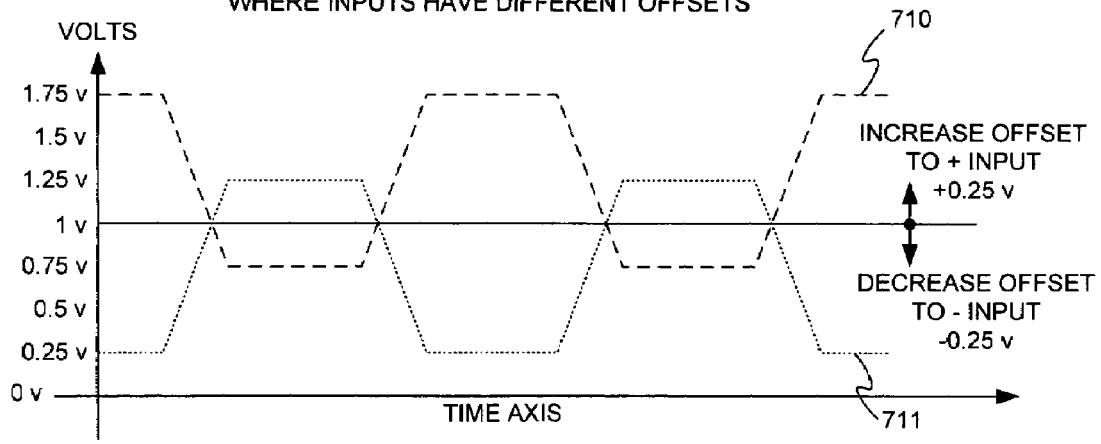
FIG. 7A depicts an example pair of differential signals that are the same as those shown in FIG. 6A, except the DC offset of one signal has been increased by 0.25 volts and the DC offset of the other signal has been decreased by 0.25 volts.

In FIG. 7A, example signal 710 is the same as signal 610, except the DC offset has been increased (e.g., increased by 0.25 volts) and signal 711 is the same as signal 611, except the DC offset has been decreased (e.g., decreased by 0.25 volts).

Figure 7B:
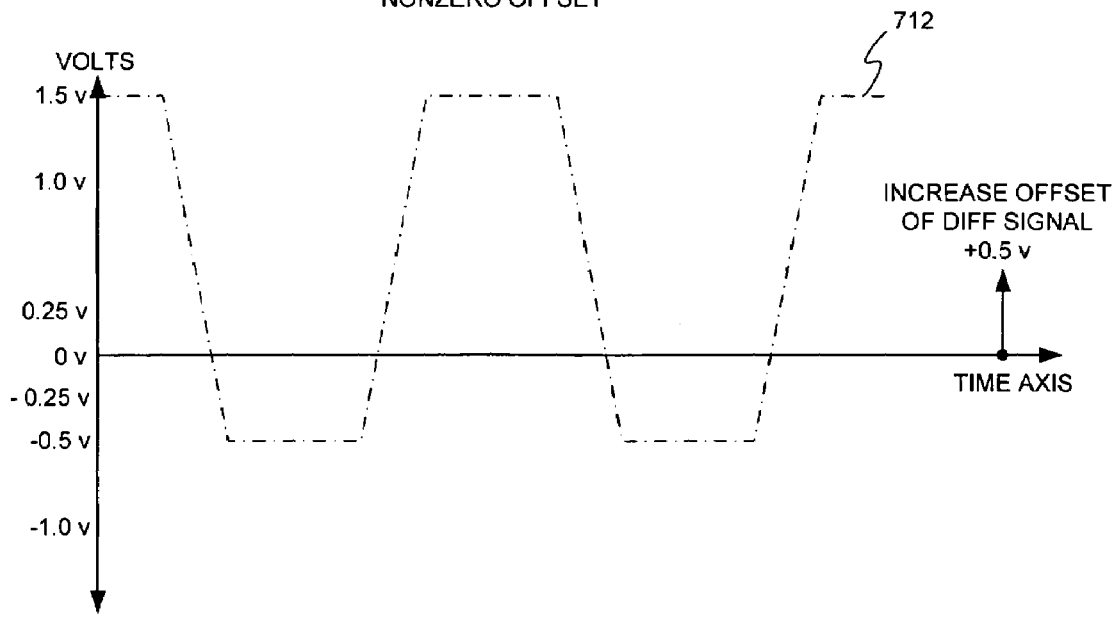
FIG. 7B depicts the differential signal 712 for the differential signal pair of FIG. 7A.

FIG. 7B depicts the differential signal 712 for the differential signal pair of FIG. 7A. As can be seen, signal 712 differs from signal 612 of FIG. 6B: the average level of 712 is greater (i.e., the DC offset of 712 is greater than that of 612 by 0.5 volts).

Any circuit, for DC offset circuit 111 (of FIG. 4A), that permits controllable differential changes to DC offset voltage, can be utilized. Example embodiments, for DC offset circuit 111, are shown in the 0603 Application (see Glossary for full cite to this application). An example embodiment, from the 0603 Application, is presented below.

Figure 8:
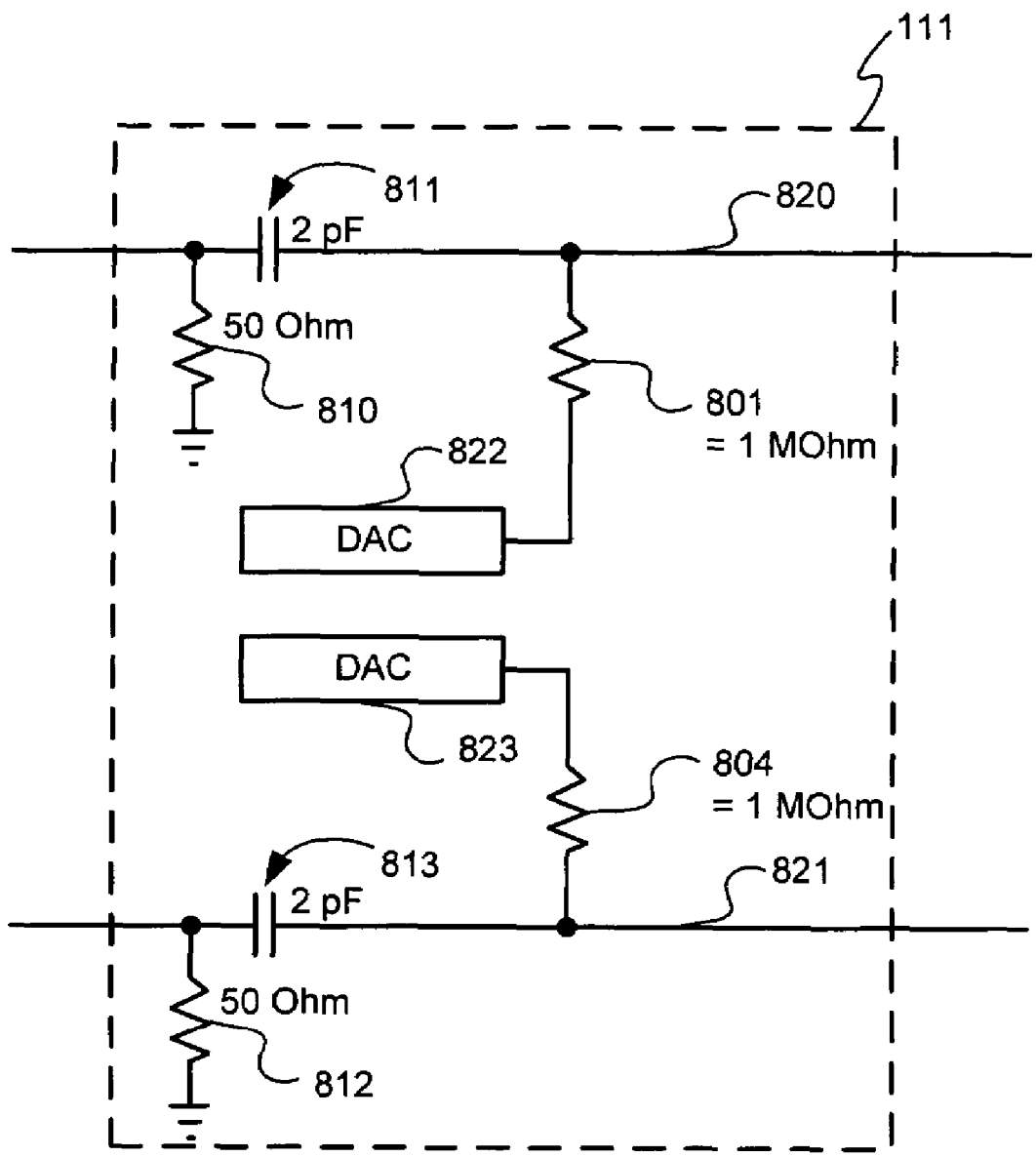
FIG. 8 depicts an example embodiment, for DC offset circuit 111, from the 0603 Application.

The circuit of FIG. 8 includes the following: a receiver with termination resistors (e.g., 810 and 812), coupling capacitors (e.g., 110 and 112) before the termination resistors and coupling capacitors (e.g., 811 and 813) after the termination resistors. In FIG. 8, resistor 801 is driven by a DAC 822 and resistor 804 is driven by a DAC 823.

To produce a DC offset of zero for a differential signal (a typical offset during normal data transmission) DACs 822 and 823 can be programmed to generate the same voltage level. For example, to produce signals 610 and 611 of FIG. 6A, DACs 822 and 823 can each be programmed to output +1.0 volt.

To produce non-zero DC offsets for a differential signal, the DACs can be programmed to produce different voltage levels. To produce signals 710 and 711 of FIG. 7A, DAC 822 can be programmed to output +1.25 volts while DAC 823 can be programmed to output +0.75 volts.

5.2. Example Computing Environment

FIG. 4B depicts a personal computer 400 comprising a Central Processing Unit (CPU) 401 (or other appropriate processor or processors) and a memory 402. Memory 402 has a portion of its memory 403 in which are stored the software tools (or computer programs) and data of the present invention. While memory 403 is depicted as a single region, those of ordinary skill in the art will appreciate that, in fact, such software and data may be distributed over several memory regions or several computers. Furthermore, depending upon the computer's memory organization (such as virtual memory), memory 402 may comprise several types of memory (including cache, random access memory, hard disk and networked file server). Computer 400 can be equipped with a display monitor 405, a mouse pointing device 404 and a keyboard 406 to provide interactivity between the software of the present invention and the equipment designer or maintainer. Computer 400 also includes a way of reading computer readable instructions from a computer readable medium 407, via a medium reader 408, into the memory 402. Computer 400 also includes a way of reading computer readable instructions via the Internet (or other network) through network interface 409.

In some embodiments, computer programs embodying the present invention, or EDA tools using the invention, are stored in a computer readable medium, e.g. CD-ROM or DVD. In other embodiments, the computer programs are embodied in an electromagnetic carrier wave. For example, the electromagnetic carrier wave may include the programs being accessed over a network.

5.3. Color Mapping

For purposes of generating a visual representation, each value, of the two-dimensional array of PDFs, can be converted into an appropriate color with a color map. Prior to applying a PDF value to a color map, it can be desirable to normalize the PDF value. An example goal of normalization is to convert the range of PDF values to fit within the range of zero to one. The normalized values can then be multiplied by a number equal to the maximum input value of the color map and then input to the color map.

It can be desirable to be able to distinguish, visually, among those PDF values representing relatively few traces (or symbols). Log-based color mapping can be used to accomplish this. In one approach, the log is found for each normalized PDF value. Such log value is then scaled and shifted into the range of the color map. Scaling can be accomplished by multiplying the log by a scaling factor. Shifting converts the logs into values that are greater than, or equal to, zero, and can be accomplished by adding an offset.

Another approach is to design the color map itself to logarithmically map from changes in input number to changes in color, such that color change, per unit change of the input number, is greater towards the lower value end of color map input. For example, PDF values representing an occurrence of 1 and 10 traces can be mapped to colors providing greater contrast than the colors for PDF values representing the occurrence of 1000 and 1100 traces.

To emphasize the difference between those PDF values representing relatively few traces and those PDF values representing zero traces, a color map can be used wherein there is a visually pronounced difference between the color assigned to a PDF value representing zero traces and the colors assigned to those PDF values representing relatively few samples.

A relevant discussion of color mapping can also be found in the 0601 Application (see Glossary for full citation).

5.4. Deserializer Usage

Figure 4C:
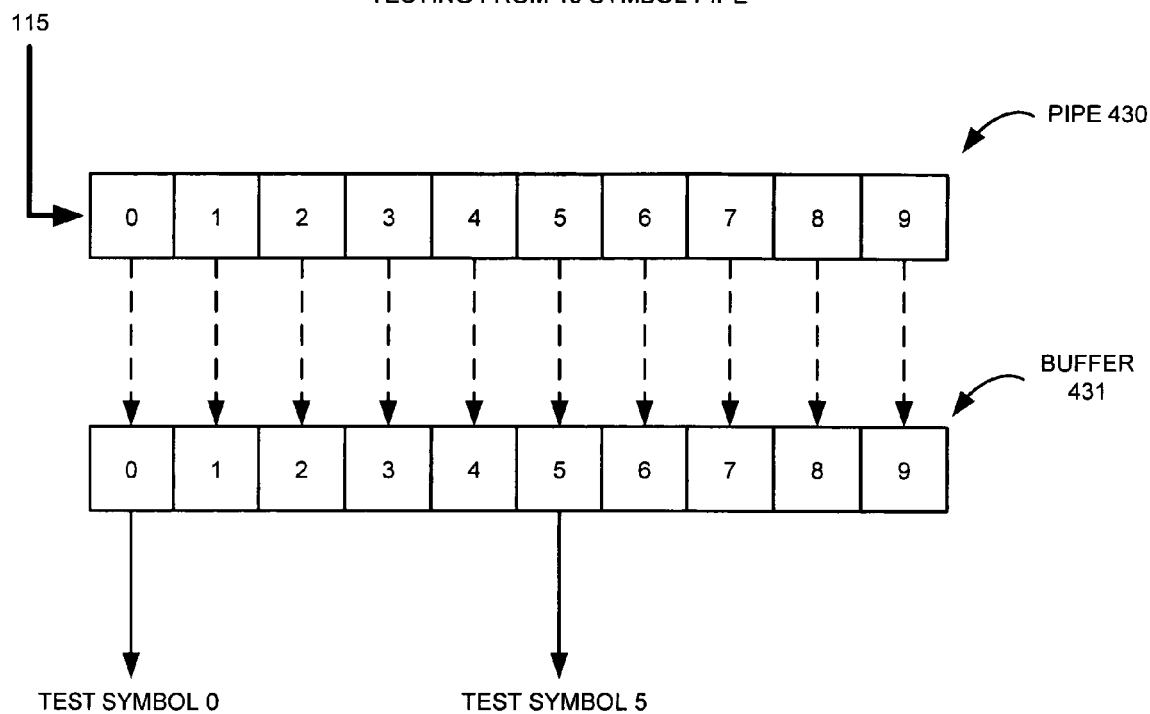
FIG. 4C depicts an example internal organization for deserializer 116 of FIG. 4A.

FIG. 4C depicts an example internal organization for deserializer 116 of FIG. 4A. Deserializer 116 accepts a serial symbol stream over input 115. Symbols received at 115 are shifted into shift register (or "pipe") 430 that can hold up to 10 symbols at locations numbered 0 to 9. Each time pipe 430 is full (i.e., contains ten symbols), the 10 symbols can be copied, in parallel, to a buffer register 431. For the next ten symbol times, while pipe 430 is refilling, the 10 symbols of buffer 431 are available for further processing.

For example, if it is desired to test only every fifth symbol, of the symbol stream received at 115, only locations 0 and 5, of buffer 431, can be read by counter unit 150 of FIG. 4A. This can be used to implement the kind of timing shown in FIG. 3B.

5.5. Data Structures

Figure 9:
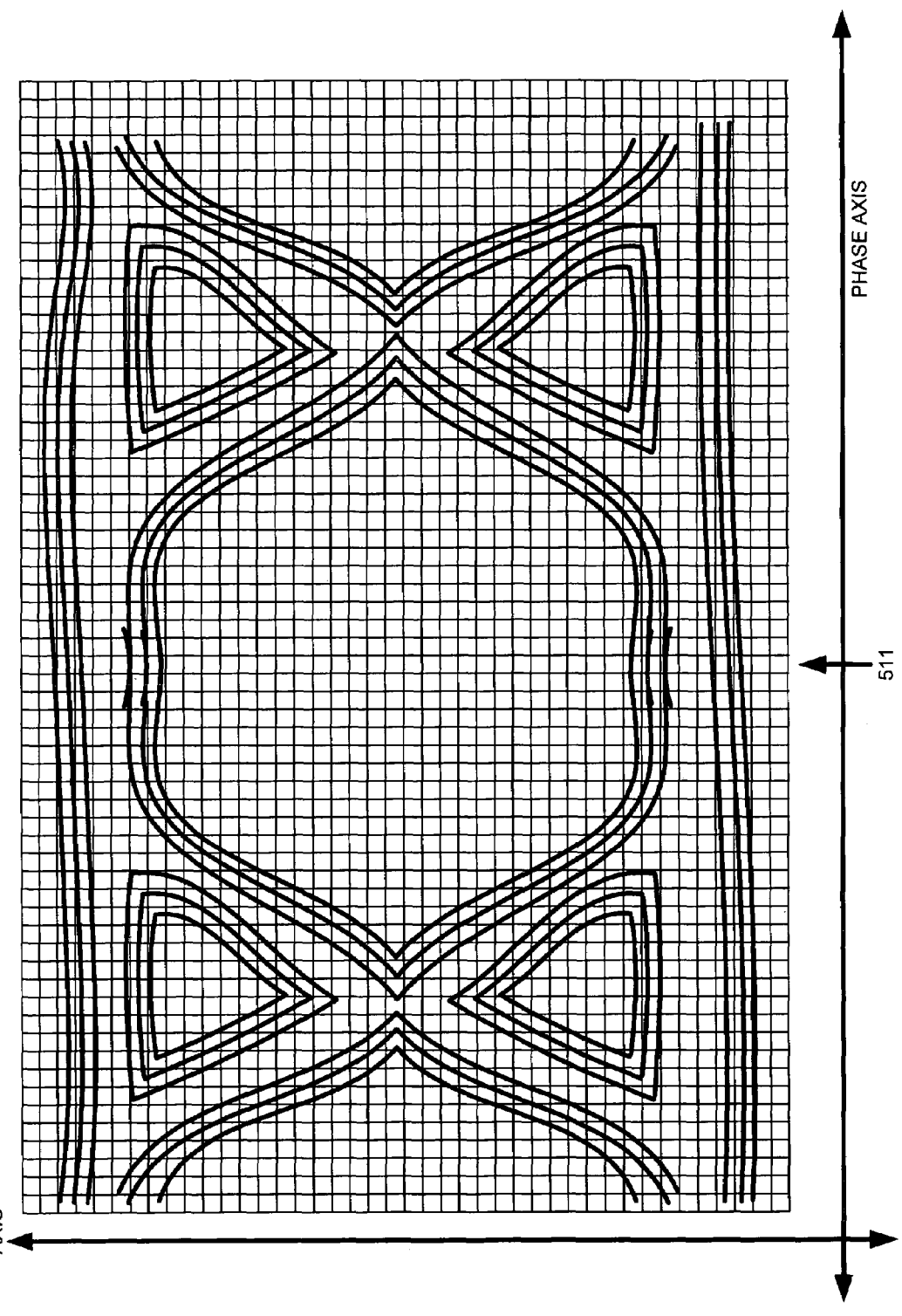
FIG. 9 depicts the eye-diagram of FIGS. 1A to 1E, but with a grid data structure superimposed.

FIG. 9 depicts the eye-diagram of FIGS. 1A to 1E, but with a grid data structure superimposed. Columns of the grid data structure are parallel to the differential signal axis while rows are parallel to the phase axis. Each column can represent a CDF, or its PDF, at a particular phase. For example, a column of values, that can represent the CDF or PDF determined for phase 511, is indicated.

5.6. Example APLL

This section presents certain details on APLL 100. More details can be found in the 0601 Application.

Figure 10:
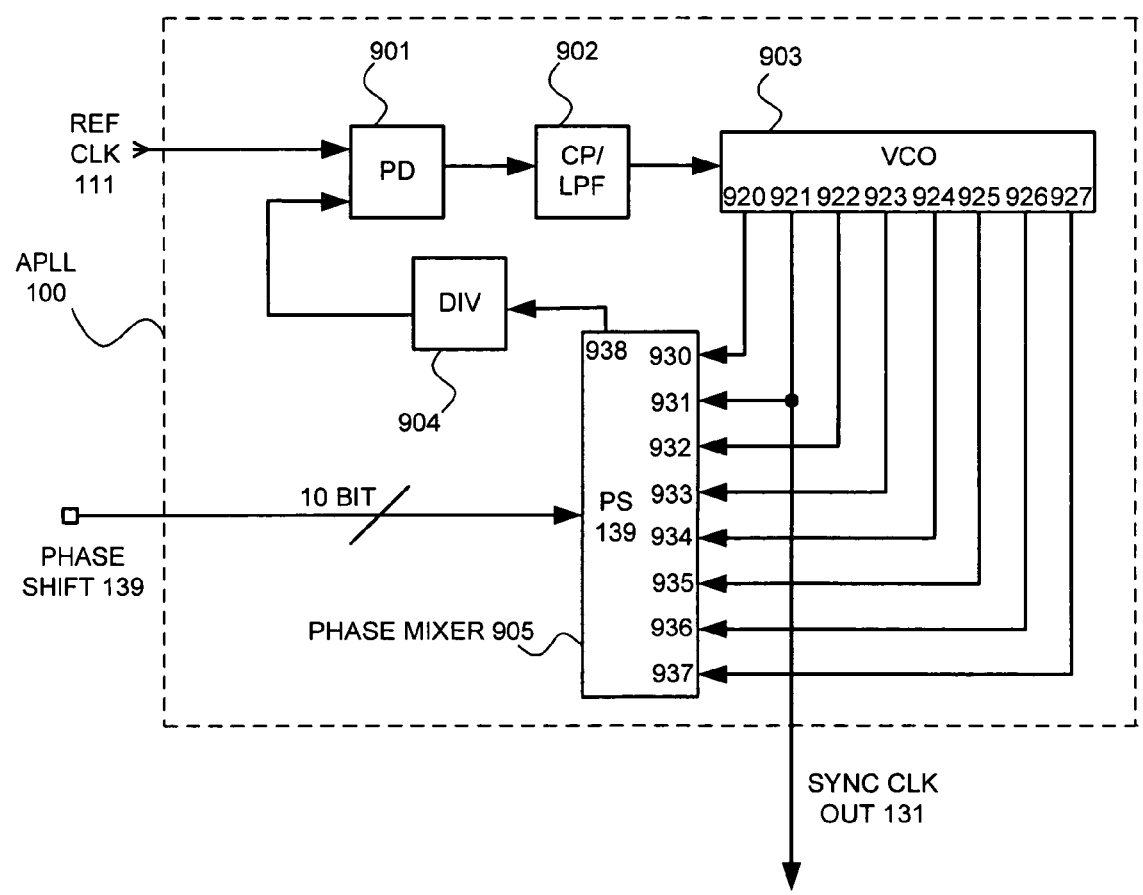
FIG. 10 presents an example embodiment of APLL 100 from the 0601 Application.
Figure 11:
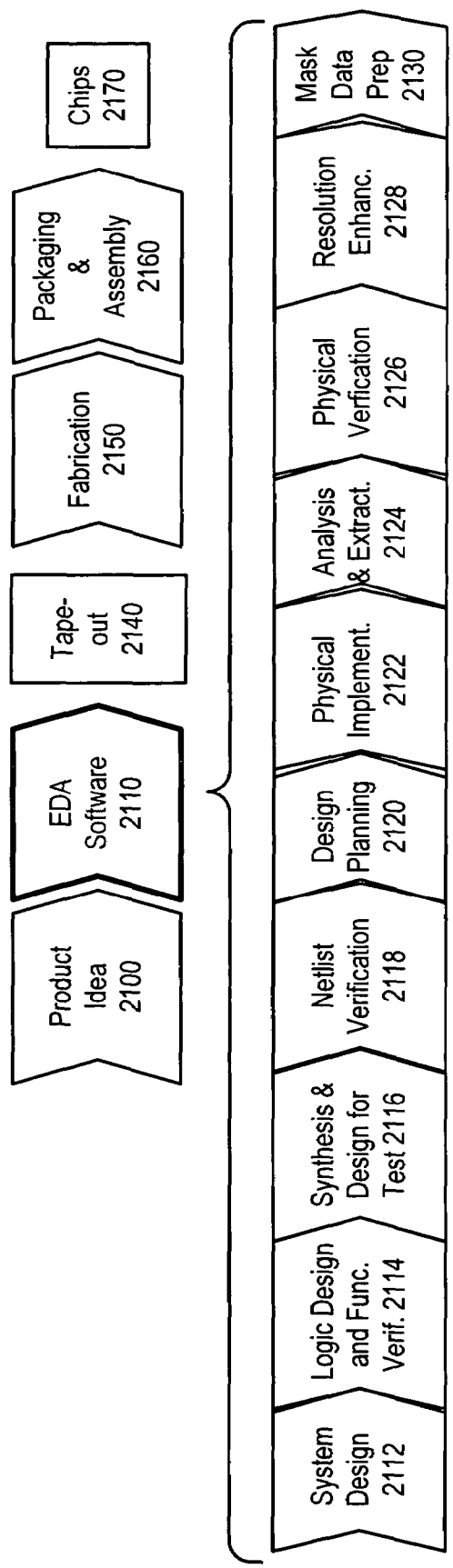
FIG. 11 shows a simplified representation of an exemplary digital ASIC design flow.

APLL 100 (see FIG. 10) contains a feedback loop, referred to herein as a "reference clock loop," that acts to phase and frequency lock VCO 903 with a reference clock 111. Specifically, the loop acts to vary the frequency of VCO 903 such that the output of divider 904 is phase locked with reference clock 111.

The reference clock loop, of APLL 100, operates as follows.

Phase differences, between reference clock 111 and the output of divider 904, are detected by phase detector 901. The output of phase detector 901 is filtered by Charge Pump/Low Pass Filter 902 to produce a signal for controlling VCO 903. While VCO 903 can provide eight clock outputs, labeled in FIG. 10 as outputs 920 to 927, for purposes of the reference clock loop, VCO 903 can be regarded as having a single frequency-controlled output. Also, for purposes of the reference clock loop, phase mixer 905 can be regarded as simply a wire that couples a single frequency-controlled output of VCO 903 to the input of divider 904. Because of the reference clock loop, in the absence of changes at phase shift input 139, the outputs of VCO 903 are phase and frequency locked with reference clock 111.

In general, a phase mixer takes N clock inputs of the same frequency but different phases and, in response to a phase shift control signal, interpolates between two of the input phases. The phase mixer outputs the interpolated phase. Each output 920 to 927 of VCO 903 provides the same frequency, but at a different phase. Phase mixer 905, in response to phase shift input 139, can select a pair of outputs from VCO 903 and, at output 938, provide a clock signal whose phase is an interpolation of the selected pair.

Increments to the value input to phase mixer 905, at phase shift input 139, cause the phase relationship, between any output of VCO 903 (e.g., output 921 that produces the sample clock at APLL 100 output 131) and the signal at differential inputs 160/161, to be shifted.

While the phase shift input to the phase mixer has a finite range, the range of phases that can be selected, by repeated application of the phase mixer, is not limited. Repeated application of the PS input 139 is analogous to the setting of time with a mechanical clock by controlling the minute hand: each complete revolution of the minute hand changes the hour hand by one hour, but continued wrapping-around by the minute hand suffices to continue advancing the hour hand through multiple hours.

6. Glossary of Selected Terms

0601 Application: refers to the following U.S. Patent Application that is herein incorporated by reference in its entirety:
  Title: Method and Apparatus For Integrated Undersampling
  Inventor: Jeffrey Lee Sonntag
  Filed: Aug. 31, 2004
  application Ser. No. 10/930,292
0603 Application: refers to the following U.S. Patent Application that is herein incorporated by reference in its entirety:
  Title: Method and Apparatus For Performance Metric Compatible Control of Data Transmission Signals
  Inventors: Jeffrey Lee Sonntag, Daniel Keith Weinlader, David Andrew Yokoyama-Martin
  application Ser No. 10/979,030
  Filing Date: Nov. 1, 2004
APLL: Analog PLL.
CDF: a cumulative distribution function at a particular phase.
CDV: a particular value, of a CDF, determined for a particular slicer level.
CDV_sampling_edges: The group of SCEs that sample each of the CDV_sample_size symbols for a particular CDV.
CDV_sample_size: a number of symbols analyzed to produce a CDV.
data_period: The number of symbols comprising one repetition of a periodic data signal.
data_period_edges: Within each group of CDV_sampling_edges, there is a group of SCEs (referred to herein as "data_period_edges") for each repetition of the periodic data. Thus, there are data_period_multiple groups of data_period_edges in each group of CDV_sampling_edges.
data_period_multiple: The number of integer multiples of data_period represented by CDV_sample_size. Thus, the CDV_sample_size symbols, sampled for the determination of a CDV, represent data_period_multiple repetitions of the input signal's pattern.
DDT: Differential Data Transmission.
DFT: Design For Test.
DSO: digital sampling oscilloscope.
DTS: Data Transmission System.
Eye-Diagram: One of the most common and interesting visualizations of a high-speed receiver's signal. Can be constructed as a composite plot by sampling a received signal, "slicing" the received signal into segments of duration equal to a single symbol-time of the signal and visually overlaying the segments.
IC: integrated circuit.
pattern offset phase: The offset phase between an SCE and the periodic pattern of the input signal it samples. Occurs when there is a symbol offset phase and when input data is periodic.
PDF: a probability distribution function at a particular phase.
SCE: sample clock edge.
symbol offset phase: The offset phase between an SCE and the symbol of the input signal it samples. Occurs when the relationship, between a DDT and a sample clock at a receiver, is synchronous.
VCO: voltage controlled oscillator.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of collecting waveform information on a data stream as received by a data receiver, comprising:
  causing the data receiver to scan phases;
  causing the data receiver slicer to scan slicer levels;
  receiving, for each scanned phase and slicer level, a first number of symbols at the data receiver while detecting whether a received symbol is of a first value and incrementing a symbol value count when the received symbol is of the first value;
  determining cumulative distribution functions based on the symbol value counts;
  determining probability distribution functions based on the cumulative distribution functions,
  color mapping the probability distribution functions; and
  producing a result that provides waveform information to indicate a signal health based on the probability distribution functions.

2. The method of claim 1, wherein the step of determining probability distribution functions further comprises the following step:
  determining a probability distribution function by finding a derivative of a corresponding cumulative distribution function.

3. The method of claim 1, further comprising the step of:
  setting the first number of symbols to be an integer multiple of a first period for repeating a pattern of the data stream.

4. The method of claim 1, further comprising the step of:
  setting a second period, for including a symbol in the first number of symbols, to be an integer multiple of a first period for repeating a pattern of the data stream.

5. The method of claim 1, further comprising the step of:
  causing the data stream to provide symbols where a percentage occurrence, of each symbol value, remains at least approximately constant.

6. The method of claim 1, further comprising the step of:
  causing the data receiver slicer, and a counter of the first number of symbols, to be on a same, physically contiguous, integrated circuit.

7. The method of claim 1, further comprising the step of:
  causing the data receiver slicer, and a counter of the first count, to be on a same, physically contiguous, integrated circuit.

8. The method of claim 1, further comprising the step of:
  causing the data receiver slicer, and an offset circuit for changing slicing levels of the data receiver slicer, to be on a same, physically contiguous, integrated circuit.

9. The method of claim 1, further comprising the step of:
  causing the data receiver slicer, and a phase shifter for changing phase settings of the data receiver slicer, to be on a same, physically contiguous, integrated circuit.

10. The method of claim 1, wherein the step of causing the data receiver to scan phases further comprises:

causing the data receiver to scan phases at a first, relatively coarse, series of phase settings, followed by a second series of phase settings that are in-between the first series of phase settings.

11. The method of claim 1, wherein the data stream encodes binary data and the first value is a binary one.

12. The method of claim 1, wherein the data stream encodes binary data and the first value is a binary zero.

13. The method of claim 2, wherein the step of determining a probability distribution function further comprises the following step:
determining a difference between two values of the corresponding cumulative distribution function.

14. The method of claim 3, further comprising the step of:
setting a second period, for including a symbol in the first number of symbols, to be prime relative to the first period for repeating a pattern of the data stream.

15. The method of claim 5, further comprising the step of:
causing the data stream to carry code space balanced data.

16. The method of claim 5, further comprising the step of:
causing the data stream to carry pseudo-random data.

17. The method of claim 5, further comprising the step of:
causing the data stream to carry random data.

18. The method of claim 5, further comprising the step of:
thresholding the probability distribution functions such that at least some waveform information, resulting from variation in the percentage occurrence of a symbol value, is removed.

19. The method of claim 9, further comprising the step of:
using the phase shifter to perform clock and data recovery for the data receiver.

20. The method of claim 15, further comprising the step of:
setting a first period, for including a symbol in the first number of symbols, such that an extent of variation, of the percentage occurrence of each symbol value, can be bounded.

21. The method of claim 20, further comprising the steps of:
rounding the first counts; and
setting the first number large enough such that a quantization noise, introduced by rounding, is less than a first noise introduced by a color mapping of the probability distribution functions.

22. A data-processing system for collecting waveform information on a data stream as received by a data receiver, comprising the following sub-systems:
a sub-system configured to accomplish causing the data receiver to scan phases;
a sub-system configured to accomplish causing the data receiver slicer to scan slicer levels;
a sub-system configured to accomplish receiving, for each scanned phase and slicer level, a first number of symbols at the data receiver while detecting whether a received symbol is of a first value and incrementing a symbol value count when the received symbol is of the first value;
a sub-system configured to accomplish determining cumulative distribution functions based on the symbol value counts;
a sub-system configured to accomplish determining probability distribution functions based on the cumulative distribution functions;
a sub-system configured to accomplish color mapping the probability distribution functions;
a sub-system configured to produce a result that provides waveform information to indicate a signal health based on the probability distribution functions.

23. A computer program on a computer readable medium, having computer-readable code devices embodied therein, for collecting waveform information on a data stream as received by a data receiver, the computer program comprising:
computer readable program code devices configured to accomplish causing the data receiver to scan phases;
computer readable program code devices configured to accomplish causing the data receiver slicer to scan slicer levels;
computer readable program code devices configured to accomplish receiving, for each scanned phase and slicer level, a first number of symbols at the data receiver while detecting whether a received symbol is of a first value and incrementing a symbol value count when the received symbol is of the first value;
computer readable program code devices configured to accomplish determining cumulative distribution functions based on the symbol value counts;
computer readable program code devices configured to accomplish determining probability distribution functions based on the cumulative distribution functions;
computer readable program code devices configured to accomplish color mapping the probability distribution functions; and
computer readable program code devices configured to accomplish producing a result that provides waveform information to indicate a signal health based on the probability distribution functions.

* * * * *